United States Patent
Yu et al.

(10) Patent No.: US 10,966,224 B2
(45) Date of Patent: Mar. 30, 2021

(54) LOGICAL CHANNEL SCHEDULING METHOD AND SYSTEM, AND APPARATUS

(71) Applicant: Huawei Technologies Co., Ltd., Shenzhen (CN)

(72) Inventors: Haifeng Yu, Beijing (CN); Xin Xiong, Beijing (CN); Feng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/365,979

(22) Filed: Mar. 27, 2019

(65) Prior Publication Data

US 2019/0223196 A1 Jul. 18, 2019

Related U.S. Application Data

(63) Continuation of application No. PCT/CN2017/103040, filed on Sep. 22, 2017.

(30) Foreign Application Priority Data

Sep. 29, 2016 (CN) .......................... 201610866520.X

(51) Int. Cl.
*H04W 72/10* (2009.01)
*H04W 72/12* (2009.01)
(Continued)

(52) U.S. Cl.
CPC ..... *H04W 72/1247* (2013.01); *H04W 72/042* (2013.01); *H04W 72/0466* (2013.01);
(Continued)

(58) Field of Classification Search
None
See application file for complete search history.

(56) References Cited

U.S. PATENT DOCUMENTS

| 2009/0196175 A1* | 8/2009 | Sammour | H04W 36/02 370/230.1 |
| 2010/0232376 A1 | 9/2010 | Wu | |

(Continued)

FOREIGN PATENT DOCUMENTS

| CN | 101902817 A | 12/2010 |
| CN | 102036390 A | 4/2011 |

(Continued)

OTHER PUBLICATIONS

"3rd Generation Partnership Project; Technical Specification Group Radio Access Network; Study on Scenarios and Requirements for Next Generation Access Technologies; (Release 14)," 3GPP TR 38.913 V0.4.0, Jun. 2016, 35 pages.

(Continued)

*Primary Examiner* — Scott M Sciacca
(74) *Attorney, Agent, or Firm* — Slater Matsil, LLP

(57) ABSTRACT

A logical channel scheduling method including receiving, by the terminal device, control information sent by a network device, where the control information includes the logical channel scheduling indication information, and the logical channel scheduling indication information is at least one of an indication that a resource is used by a logical channel separately, an update indication of a prioritized bit rate (PBR) scheduled for the logical channel, and an update indication of a logical channel priority (LCP) scheduled for the logical channel; and obtaining, by the terminal device according to the logical channel scheduling indication information, an uplink scheduling resource used for sending logical channel data.

20 Claims, 23 Drawing Sheets

(51) Int. Cl.
*H04W 76/00* (2018.01)
*H04W 76/11* (2018.01)
*H04W 76/27* (2018.01)
*H04W 72/04* (2009.01)
*H04W 80/02* (2009.01)

(52) U.S. Cl.
CPC ... *H04W 72/1242* (2013.01); *H04W 72/1268* (2013.01); *H04W 76/11* (2018.02); *H04W 76/27* (2018.02); *H04W 80/02* (2013.01); *H04W 72/1289* (2013.01)

(56) References Cited

U.S. PATENT DOCUMENTS

| | | | |
|---|---|---|---|
| 2011/0130099 A1* | 6/2011 | Madan | H04W 72/1226 455/63.1 |
| 2011/0170495 A1 | 7/2011 | Earnshaw et al. | |
| 2012/0076103 A1 | 3/2012 | Dai et al. | |
| 2015/0264631 A1 | 9/2015 | Zhang et al. | |
| 2016/0262149 A1 | 9/2016 | Futaki et al. | |
| 2017/0164238 A1* | 6/2017 | Paredes Cabrera | H04L 69/22 |
| 2018/0234212 A1* | 8/2018 | Park | H04B 7/022 |

FOREIGN PATENT DOCUMENTS

| | | |
|---|---|---|
| CN | 102123512 A | 7/2011 |
| CN | 102149146 A | 8/2011 |
| CN | 103313411 A | 9/2013 |
| CN | 103702422 A | 4/2014 |
| CN | 103716885 A | 4/2014 |
| EP | 2343946 A2 | 7/2011 |
| EP | 2733908 A1 | 5/2014 |
| WO | 2015046787 A1 | 4/2015 |
| WO | 2016001715 A1 | 1/2016 |

OTHER PUBLICATIONS

3rd Generation Partnership Project;Technical Specification Group Radio Access Network; Evolved Universal Terrestrial Radio Access (E-UTRA);Radio Resource Control (RRC); Protocol specification (Release 13), 3GPP TS 36.331 V13.2.0, Jun. 2016, 623 pages.

"Discussion on Logical Channel Prioritization," Agenda Item: 7.1.1.7, Source: ZTE, Document for: Discussion and Decision, 3GPP TSG RAN WG2 #69bis, R2-102178, Beijing, China, Apr. 12-16, 2010, 3 pages.

* cited by examiner

LOGICAL CHANNEL SCHEDULING METHOD AND SYSTEM, AND APPARATUS

CROSS-REFERENCE TO RELATED APPLICATIONS

This application is a continuation application of international application No. PCT/CN2017/103040, filed on Sep. 22, 2017, which claims priority to Chinese Patent Application No. 201610866520.X, filed on Sep. 29, 2016, The disclosures of the aforementioned applications are hereby incorporated by reference in their entireties.

TECHNICAL FIELD

Embodiments of the present invention relate to the communications field, and in particular, to a logical channel scheduling method and system, and an apparatus.

BACKGROUND

With rapid development of the fifth generation mobile communications technology (5G), mobile communications exerts great impact on people's life and work. Application scenarios of 5G usually include enhanced mobile broadband (eMBB), massive machine-type communications (mMTC), and ultra-reliable and low latency communications (URLLC). Because a URLLC service has a relatively high requirement on a service latency and service reliability, how to ensure a service requirement of another logical channel while ensuring a requirement of the URLLC service becomes a problem to be resolved urgently.

Before sending uplink data to a network device, an existing terminal device first needs to receive an uplink scheduling resource sent by the network device. Because a total quantity of uplink scheduling resources is determined, the terminal device needs to determine, according to a specific rule, a quantity of uplink scheduling resources that can be allocated to each logical channel. Usually, the terminal device determines, based on a logical channel configuration, the quantity of uplink scheduling resources that can be allocated to each logical channel. The logical channel configuration is a prioritized bit rate (PBR) or a logical channel priority (LCP) scheduled for a logical channel. After the terminal device allocates an uplink scheduling resource to each logical channel, if an uplink scheduling resource allocated to a specific logical channel cannot satisfy a requirement for scheduling a buffer on the logical channel, the terminal device needs to modify a logical channel configuration of the logical channel in a Radio Resource Control (RRC) configuration.

However, a process in which the terminal device modifies the logical channel configuration of the logical channel in the RRC configuration (this process is also referred to as an RRC reconfiguration process) is relatively complex, and is likely to cause overstocking to the buffer on the logical channel. In addition, modifying the logical channel configuration of the logical channel in the RRC reconfiguration process generates a relatively large amount of RRC signaling, affecting performance of the terminal device.

SUMMARY

Embodiments of the present invention provide a logical channel scheduling method and system, and an apparatus, to dynamically send logical channel scheduling indication information to a terminal device, thereby ensuring that a logical channel configuration satisfies a real-time scheduling requirement, and improving transmission performance of the terminal device while reducing RRC signaling overheads required by the logical channel configuration.

To achieve the foregoing objectives, the following technical solutions are used in the embodiments of the present invention.

According to a first aspect, an embodiment of the present invention provides a logical channel scheduling method. A terminal device receives control information sent by a network device, where the control information includes logical channel scheduling indication information (including an indication that a logical channel does not support multiplexing and that a resource is used by a logical channel separately, an indication of a PBR scheduled for the logical channel, or an indication of a logical channel priority (LCP)). Subsequently, the terminal device obtains, according to the received logical channel scheduling indication information, an uplink scheduling resource used for sending logical channel data. As can be seen, according to the logical channel scheduling method provided in this embodiment of the present invention, the terminal device can directly receive the control information sent by the network device, and the control information includes the indication that the logical channel does not support multiplexing and that a resource is used by a logical channel separately, the indication of the PBR scheduled for the logical channel, or the indication of the LCP (in the following, the indication of the PBR scheduled for the logical channel represents an update indication of the PBR scheduled for the logical channel, and the indication of the LCP represents an update indication of the LCP), to obtain, by using the indication that the logical channel does not support multiplexing and that a resource is used by a logical channel separately, the indication of the PBR scheduled for the logical channel, or the indication of the LCP, the uplink scheduling resource used for sending the logical channel data. Compared with a conventional RRC reconfiguration process, dynamically sending the logical channel scheduling indication information to the terminal device ensures that a logical channel configuration satisfies a real-time scheduling requirement. In addition, in the logical channel scheduling indication method in which the indication of the PBR scheduled for the logical channel or the indication of the LCP is sent by using a control message, an RRC reconfiguration procedure required by the logical channel configuration is avoided, so that transmission performance of the terminal device is improved while RRC signaling overheads are reduced.

In a first implementable manner of the first aspect, if the logical channel scheduling indication information is the indication that a resource is used by a logical channel separately, a process in which the terminal device receives the control information sent by the network device is receiving, by the terminal device, a Radio Resource Control RRC reconfiguration message (the RRC reconfiguration message may also be referred to as an RRC message, and the RRC reconfiguration message below represents an RRC message) sent by the network device, and decoding the RRC reconfiguration message, to obtain the indication that a resource is used by a logical channel separately, so that the terminal device obtains, according to the indication that a resource is used by a logical channel separately, an uplink scheduling resource that is allocated by the network device to the logical channel and that can be used separately.

In a second implementable manner of the first aspect, if the logical channel scheduling indication information is the indication of the PBR scheduled for the logical channel or the indication of the LCP, a process in which the terminal device receives the control information sent by the network device is receiving, by the terminal device, a control message (for example, a physical downlink control channel (PDCCH) or a Medium Access Control control element (MAC CE)) sent by the network device, where an indication of the PDCCH includes the indication of the PBR scheduled for the logical channel or the indication of the LCP, and an indication of the MAC CE includes the indication of the PBR scheduled for the logical channel or the indication of the LCP, and parsing, by the terminal device, the control message, to obtain the indication of the PBR scheduled for the logical channel or the indication of the LCP, so that the terminal device obtains, according to the indication of the PBR scheduled for the logical channel, the PBR scheduled for the logical channel, and allocates the uplink scheduling resource to the logical channel, or so that the terminal device obtains the LCP according to the indication of the LCP, and allocates the uplink scheduling resource to the logical channel.

According to the logical channel scheduling method provided in this embodiment of the present invention, the uplink scheduling resource used for sending the logical channel data can be properly obtained from two different perspectives, thereby ensuring that the logical channel configuration of the logical channel conforms to the real-time scheduling requirement. From one perspective, a specific quantity of uplink scheduling resources that can be individually are allocated by the network device to the logical channel, and from the other perspective, an old logical channel configuration inside the terminal device is replaced with a new logical channel configuration sent by the network device, so that the terminal device allocates the uplink scheduling resource to the logical channel by using the new logical channel configuration.

Optionally, the terminal device may further update and store the PBR scheduled for the logical channel or the LCP, to ensure time validity of the PBR scheduled for the logical channel or the LCP that is stored in the terminal device.

Further, the logical channel scheduling indication information is scrambled by using a radio network temporary identifier (RNTI) of the logical channel corresponding to the logical channel scheduling indication information or by using a dedicated RNTI of a radio bearer, so that the terminal device descrambles the scrambled logical channel scheduling indication information after receiving the control information sent by the network device, to learn of a specific logical channel, corresponding to the logical channel scheduling indication information, of the terminal device.

Further, a length of the indication of the PBR scheduled for the logical channel is one bit or two bits, and a length of the indication of the LCP is one bit or four bits.

Optionally, when the length of the indication of the PBR scheduled for the logical channel is one bit, using a binary system as an example, the indication of the PBR being 0 indicates that the PBR of the logical channel remains unchanged, and the indication of the PBR being 1 indicates that the PBR of the logical channel is set to infinity.

Optionally, when the length of the indication of the PBR scheduled for the logical channel is one bit, using a binary system as an example, the indication of the PBR being 0 indicates that the PBR of the logical channel is increased to a next value range, and the indication of the PBR being 1 indicates that the PBR of the logical channel is decreased to a next value range.

Optionally, when the length of the indication of the PBR scheduled for the logical channel is two bits, using a binary system as an example, the indication of the PBR being 00 indicates that the PBR of the logical channel is adjusted to 25% of an old PBR inside the terminal device, the indication of the PBR being 01 indicates that the PBR of the logical channel is adjusted to 50% of the old PBR inside the terminal device, the indication of the PBR being 10 indicates that the PBR of the logical channel is adjusted to 100% of the old PBR inside the terminal device, and the indication of the PBR being 11 indicates that the PBR of the logical channel is adjusted to 200% of the old PBR inside the terminal device.

Optionally, when the length of the indication of the LCP is one bit, using a binary system as an example, the indication of the LCP being 0 indicates that the LCP of the logical channel is increased to a next value range, and the indication of the LCP being 1 indicates that the LCP of the logical channel is decreased to a next value range.

Optionally, when the length of the indication of the LCP is four bits, the four bits show a level of the LCP.

According to a second aspect, an embodiment of the present invention provides a logical channel scheduling method. A network device obtains logical channel scheduling indication information (including an indication that a logical channel does not support multiplexing and that a resource is used by the logical channel separately, an indication of a prioritized bit rate PBR scheduled for the logical channel, or an indication of a logical channel priority LCP). Subsequently, the network device sends control information including the logical channel scheduling indication information to a terminal device.

Optionally, if the logical channel scheduling indication information is the indication that a resource is used by a logical channel separately, a process in which the network device sends the control information to the terminal device is sending, by the network device to the terminal device, an RRC reconfiguration message including the indication that a resource is used by a logical channel separately.

Optionally, if the logical channel scheduling indication information is the indication of the PBR scheduled for the logical channel or the indication of the LCP, a process in which the network device sends the control information to the terminal device is sending, by the network device, a control message (a physical downlink control channel (PDCCH) or a Medium Access Control control element (MAC CE)) to the terminal device, where an indication of the PDCCH includes the indication of the PBR scheduled for the logical channel or the indication of the LCP, and an indication of the MAC CE includes the indication of the PBR scheduled for the logical channel or the indication of the LCP.

Further, the logical channel scheduling indication information is scrambled by using an RNTI of the logical channel corresponding to the logical channel scheduling indication information or by using a dedicated RNTI of a radio bearer.

Optionally, a length of the indication of the PBR scheduled for the logical channel is one bit or two bits, and a length of the indication of the LCP is one bit or four bits.

According to a third aspect, an embodiment of the present invention provides a logical channel scheduling method. A terminal device receives first control information that is sent by a network device and that includes logical channel scheduling indication information (the logical channel scheduling indication information is an indication that a resource is used by a logical channel separately or an indication that a resource is used by more than one logical channel). After determining that the logical channel scheduling indication information is the indication that a resource is used by a logical channel separately, the terminal device obtains, according to the logical channel scheduling indication information, an uplink scheduling resource that is allocated by the network device to the logical channel and that can be used separately. As can be seen, in the logical channel scheduling method provided in this embodiment of the present invention, the terminal device first can receive the first control information that is sent by the network device and that includes the logical channel scheduling indication information, and determine whether the logical channel scheduling indication information is the indication that a resource is used by a logical channel separately. If the logical channel scheduling indication information is the indication that a resource is used by a logical channel separately, the terminal device can directly obtain the uplink scheduling resource that is allocated by the network device to the logical channel and that can be used separately. Compared with a conventional RRC reconfiguration procedure, dynamically sending the logical channel scheduling indication information to the terminal device ensures that the logical channel can have the uplink scheduling resource that can be used separately, so that a logical channel configuration satisfies a real-time scheduling requirement, thereby improving transmission performance of the terminal device.

Further, the logical channel scheduling method provided in this embodiment of the present invention further includes after determining that the logical channel scheduling indication information is the indication that a resource is used by more than one logical channel, receiving, by the terminal device, second control information that is sent by the network device and that includes an indication of a prioritized bit rate PBR scheduled for the logical channel or an indication of a logical channel priority LCP, and obtaining, according to the indication of the PBR scheduled for the logical channel or the indication of the LCP, an uplink scheduling resource used for sending logical channel data. As can be seen, when the logical channel scheduling indication information is the indication that a resource is used by more than one logical channel, in this embodiment of the present invention, the network device can further send the second control information including the indication of the prioritized bit rate PBR scheduled for the logical channel or the indication of the logical channel priority LCP. The terminal device replaces an old logical channel configuration inside the terminal device with a new logical channel configuration sent by the network device, so that the terminal device allocates the uplink scheduling resource to the logical channel by using the new logical channel configuration. In addition, compared with a conventional RRC reconfiguration process, an RRC reconfiguration process required by the logical channel configuration is avoided in the method, thereby reducing RRC signaling overheads.

Optionally, the step of obtaining, by the terminal device according to the indication of the PBR scheduled for the logical channel or the indication of the LCP, an uplink scheduling resource used for sending logical channel data is specifically obtaining, by the terminal device according to the indication of the PBR scheduled for the logical channel, the PBR scheduled for the logical channel, and allocating the uplink scheduling resource to the logical channel based on the PBR scheduled for the logical channel, or obtaining, by the terminal device, the LCP according to the indication of the LCP, and allocating the uplink scheduling resource to the logical channel based on the LCP. As can be seen, the terminal device can replace the old logical channel configuration inside the terminal device with the new logical channel configuration sent by the network device, so that the terminal device allocates the uplink scheduling resource to the logical channel by using the new logical channel configuration.

Optionally, the terminal device may further update and store the PBR scheduled for the logical channel or the LCP, to ensure time validity of the PBR scheduled for the logical channel or the LCP that is stored in the terminal device.

Optionally, the logical channel scheduling indication information is scrambled by using a radio network temporary identifier RNTI of the logical channel corresponding to the logical channel scheduling indication information or by using a dedicated RNTI of a radio bearer, so that the terminal device descrambles the scrambled logical channel scheduling indication information after receiving the control information sent by the network device, to learn of a specific logical channel, corresponding to the logical channel scheduling indication information, of the terminal device.

Optionally, the first control information is a Radio Resource Control RRC reconfiguration message, and the second control information is a physical downlink control channel PDCCH or a Medium Access Control control element MAC CE.

Optionally, a length of the indication of the PBR scheduled for the logical channel is one bit or two bits, and a length of the indication of the LCP is one bit or four bits.

Optionally, when the length of the indication of the PBR scheduled for the logical channel is one bit, using a binary system as an example, the indication of the PBR being 0 indicates that the PBR of the logical channel remains unchanged, and the indication of the PBR being 1 indicates that the PBR of the logical channel is set to infinity.

Optionally, when the length of the indication of the PBR scheduled for the logical channel is one bit, using a binary system as an example, the indication of the PBR being 0 indicates that the PBR of the logical channel is increased to a next value range, and the indication of the PBR being 1 indicates that the PBR of the logical channel is decreased to a next value range.

Optionally, when the length of the indication of the PBR scheduled for the logical channel is two bits, using a binary system as an example, the indication of the PBR being 00 indicates that the PBR of the logical channel is adjusted to 25% of an old PBR inside the terminal device, the indication of the PBR being 01 indicates that the PBR of the logical channel is adjusted to 50% of the old PBR inside the terminal device, the indication of the PBR being 10 indicates that the PBR of the logical channel is adjusted to 100% of the old PBR inside the terminal device, and the indication of the PBR being 11 indicates that the PBR of the logical channel is adjusted to 200% of the old PBR inside the terminal device.

Optionally, when the length of the indication of the LCP is one bit, using a binary system as an example, the indication of the LCP being 0 indicates that the LCP of the logical channel is increased to a next value range, and the indication of the LCP being 1 indicates that the LCP of the logical channel is decreased to a next value range.

Optionally, when the length of the indication of the LCP is four bits, the four bits show a level of the LCP.

According to a fourth aspect, an embodiment of the present invention provides a logical channel scheduling method. A network device obtains logical channel scheduling indication information (an indication that a resource is used by a logical channel separately or an indication that a resource is used by more than one logical channel). Subsequently, the network device sends first control information including the logical channel scheduling indication information to a terminal device.

Further, after the network device sends the first control information to the terminal device, the logical channel scheduling method provided in this embodiment of the present invention further includes obtaining, by the network device, an indication of a prioritized bit rate PBR scheduled for the logical channel or an indication of a logical channel priority LCP, and subsequently, sending, by the network device, second control information including the indication of the PBR scheduled for the logical channel or the indication of the LCP to the terminal device.

Optionally, the logical channel scheduling indication information is scrambled by using a radio network temporary identifier RNTI of the logical channel corresponding to the logical channel scheduling indication information or by using a dedicated RNTI of a radio bearer.

Optionally, the first control information is a Radio Resource Control RRC reconfiguration message, and the second control information is a physical downlink control channel PDCCH or a Medium Access Control control element MAC CE.

Optionally, a length of the indication of the PBR scheduled for the logical channel is one bit or two bits, and a length of the indication of the LCP is one bit or four bits.

According to a fifth aspect, an embodiment of the present invention provides a terminal device. The terminal device includes a receiving module and a processing module. Functions implemented by units or modules provided in this embodiment of the present invention are specifically as follows. The receiving module is configured to receive control information sent by a network device, where the control information includes logical channel scheduling indication information (including an indication that a resource is used by a logical channel separately, an indication of a prioritized bit rate PBR scheduled for the logical channel, or an indication of a logical channel priority LCP), and the processing module is configured to, after the receiving module receives the control information sent by the network device, obtain, according to the logical channel scheduling indication information, an uplink scheduling resource used for sending logical channel data.

Optionally, if the logical channel scheduling indication information is the indication that a resource is used by more than one logical channel, the receiving module is specifically configured to receive a Radio Resource Control (RRC) reconfiguration message that is sent by the network device and that includes the indication that a resource is used by a logical channel separately, and parse the RRC reconfiguration message, to obtain the indication that a resource is used by a logical channel separately, and the processing module is specifically configured to obtain, according to the logical channel scheduling indication information, an uplink scheduling resource that is allocated by the network device to the logical channel and that can be used separately.

Optionally, if the logical channel scheduling indication information is the indication of the PBR scheduled for the logical channel or the indication of the LCP, the receiving module is specifically configured to receive the control information (for example, a physical downlink control channel (PDCCH) or a Medium Access Control control element (MAC CE)) sent by the network device, where an indication of the PDCCH includes the indication of the PBR scheduled for the logical channel or the indication of the LCP, and an indication of the MAC CE includes the indication of the PBR scheduled for the logical channel or the indication of the LCP, and parse the control information, to obtain the indication of the PBR scheduled for the logical channel or the indication of the LCP, and the processing module is specifically configured to obtain, according to the indication of the PBR scheduled for the logical channel, the PBR scheduled for the logical channel, and allocate the uplink scheduling resource to the logical channel based on the PBR scheduled for the logical channel, or obtain the LCP according to the indication of the LCP, and allocate the uplink scheduling resource to the logical channel based on the LCP.

Optionally, the terminal device further includes a storage module. The storage module is configured to after the processing module obtains, according to the indication of the PBR scheduled for the logical channel, the PBR scheduled for the logical channel, or obtains the LCP according to the indication of the LCP, update and store the PBR scheduled for the logical channel or the LCP.

Optionally, the logical channel scheduling indication information is scrambled by using an RNTI of the logical channel corresponding to the logical channel scheduling indication information or by using a dedicated RNTI of a radio bearer.

Optionally, a length of the indication of the PBR scheduled for the logical channel is one bit or two bits, and a length of the indication of the LCP is one bit or four bits.

According to a sixth aspect, an embodiment of the present invention provides a network device. The network device includes an obtaining module and a sending module. Functions implemented by units or modules provided in this embodiment of the present invention are specifically as follows. The obtaining module is configured to obtain logical channel scheduling indication information (including an indication that a logical channel does not support multiplexing and that a resource is used by a logical channel separately, a prioritized bit rate PBR scheduled for the logical channel, or an LCP scheduled for the logical channel), and the sending module is configured to, after the obtaining module obtains the logical channel scheduling indication information, send control information including the logical channel scheduling indication information to a terminal device.

Optionally, if the logical channel scheduling indication information is the indication that a resource is used by a logical channel separately, the sending module is specifically configured to send a Radio Resource Control RRC reconfiguration message to the terminal device, where the RRC reconfiguration message includes the indication that a resource is used by a logical channel separately.

Optionally, if the logical channel scheduling indication information is an indication of the PBR scheduled for the logical channel or an indication of the LCP scheduled for the logical channel, the sending module is specifically configured to send a control message (for example, a physical downlink control channel PDCCH or a Medium Access Control control element MAC CE) to the terminal device, where an indication of the PDCCH includes the indication of the PBR scheduled for the logical channel or the indication of the LCP scheduled for the logical channel, and an indication of the MAC CE includes the indication of the PBR scheduled for the logical channel or the indication of the LCP scheduled for the logical channel.

Optionally, the logical channel scheduling indication information is scrambled by using an RNTI of the logical channel corresponding to the logical channel scheduling indication information or by using a dedicated RNTI of a radio bearer.

Optionally, a length of the indication of the PBR scheduled for the logical channel is one bit or two bits, and a length of the indication of the LCP is one bit or four bits.

According to a seventh aspect, an embodiment of the present invention provides a terminal device. The terminal device includes a receiving module, a determining module, and a processing module. Functions implemented by units or modules provided in this embodiment of the present invention are specifically as follows. The receiving module is configured to receive first control information that is sent by a network device and that includes logical channel scheduling indication information (the logical channel scheduling indication information is an indication that a resource is used by a logical channel separately or an indication that a resource is used by more than one logical channel), the determining module is configured to, after the receiving module receives the first control information sent by the network device, determine that the logical channel scheduling indication information is the indication that a resource is used by a logical channel separately, and the processing module is configured to, after the determining module determines that the logical channel scheduling indication information is the indication that a resource is used by a logical channel separately, obtain, according to the logical channel scheduling indication information, an uplink scheduling resource that is allocated by the network device to the logical channel and that can be used separately.

Optionally, the determining module is further configured to, after the receiving module receives the first control information sent by the network device, determine that the logical channel scheduling indication information is the indication that a resource is used by more than one logical channel, the receiving module is further configured to, after the determining module determines that the logical channel scheduling indication information is the indication that a resource is used by more than one logical channel, receive second control information that is sent by the network device and that includes an indication of a prioritized bit rate PBR scheduled for the logical channel or an indication of a logical channel priority LCP scheduled for the logical channel, and the processing module is further configured to, after the receiving module receives the second control information sent by the network device, obtain, according to the indication of the PBR scheduled for the logical channel or the indication of the LCP scheduled for the logical channel, an uplink scheduling resource used for sending logical channel data.

Optionally, the processing module is specifically configured to obtain, according to the indication of the PBR scheduled for the logical channel, the PBR scheduled for the logical channel, and allocate the uplink scheduling resource to the logical channel based on the PBR scheduled for the logical channel, or obtain the LCP according to the indication of the LCP, and allocate the uplink scheduling resource to the logical channel based on the LCP.

Optionally, the terminal device further includes a storage module. The storage module is configured to, after the processing module obtains, according to the indication of the PBR scheduled for the logical channel, the PBR scheduled for the logical channel, or obtains the LCP according to the indication of the LCP, update and store the PBR scheduled for the logical channel or the LCP scheduled for the logical channel.

Optionally, the logical channel scheduling indication information is scrambled by using a radio network temporary identifier RNTI of the logical channel corresponding to the logical channel scheduling indication information or by using a dedicated RNTI of a radio bearer.

Optionally, the first control information is a Radio Resource Control RRC reconfiguration message, and the second control information is a physical downlink control channel PDCCH or a Medium Access Control control element MAC CE.

Optionally, a length of the indication of the PBR scheduled for the logical channel is one bit or two bits, and a length of the indication of the LCP is one bit or four bits.

According to an eighth aspect, an embodiment of the present invention provides a network device. The network device includes an obtaining module and a sending module. Functions implemented by units or modules provided in this embodiment of the present invention are specifically as follows. The obtaining module is configured to obtain logical channel scheduling indication information (an indication that a resource is used by a logical channel separately or an indication that a resource is used by more than one logical channel), and the sending module is configured to, after the obtaining module obtains the logical channel scheduling indication information, send first control information including the logical channel scheduling indication information to a terminal device.

Optionally, the obtaining module is further configured to, after the sending module sends the first control information to the terminal device, obtain an indication of a prioritized bit rate PBR scheduled for the logical channel or an indication of a logical channel priority LCP, and the sending module is further configured to, after the obtaining module obtains the indication of the prioritized bit rate PBR scheduled for the logical channel or the indication of the logical channel priority LCP, send second control information including the indication of the PBR scheduled for the logical channel or the indication of the LCP scheduled for the logical channel to the terminal device.

Optionally, the logical channel scheduling indication information is scrambled by using a radio network temporary identifier RNTI of the logical channel corresponding to the logical channel scheduling indication information or by using a dedicated RNTI of a radio bearer.

Optionally, the first control information is a Radio Resource Control RRC reconfiguration message, and the second control information is a physical downlink control channel PDCCH or a Medium Access Control control element MAC CE.

Optionally, a length of the indication of the PBR scheduled for the logical channel is one bit or two bits, and a length of the indication of the LCP is one bit or four bits.

Optionally, according to the first aspect to the eighth aspect, the RRC message (that is, the RRC reconfiguration message) may further include an initial PBR scheduled for the logical channel or an initial LCP scheduled for the logical channel. When updating the PBR of the logical channel for the first time, the terminal device updates the initial PBR of the logical channel to a new PBR of the logical channel according to the update indication of the PBR scheduled for the logical channel. When updating the LCP for the first time, the terminal device updates the initial LCP to a new LCP according to the update indication of the LCP.

According to a ninth aspect, an embodiment of the present invention further provides a terminal device. The terminal device includes a memory, a processor, a communications interface, and a system bus. The memory, the processor, and the communications interface are connected by using the system bus. The memory is configured to store a computer instruction. The processor is configured to execute the computer instruction stored in the memory, so that the terminal device performs the logical channel scheduling method according to the first aspect or the third aspect.

According to a tenth aspect, an embodiment of the present invention further provides a network device. The network device includes a memory, a processor, a communications interface, and a system bus. The memory, the processor, and the communications interface are connected by using the system bus. The memory is configured to store a computer instruction. The processor is configured to execute the computer instruction stored in the memory, so that the network device performs the logical channel scheduling method according to the second aspect or the fourth aspect.

According to an eleventh aspect, an embodiment of the present invention further provides a logical channel scheduling system. The logical channel scheduling system includes a terminal device having any feature according to the fifth aspect and a network device having any feature according to the sixth aspect, or includes a terminal device having any feature according to the seventh aspect and a network device having any feature according to the eighth aspect, or includes a terminal device having any feature according to the ninth aspect and a network device having any feature according to the tenth aspect.

In this application, names of the terminal device and the network device do not constitute any limitation on devices or functional modules. The devices or functional modules may have other names in actual implementation. The devices or functional modules fall within the scopes of claims and an equivalent technology of this application provided that functions of the devices or functional modules are similar to those in this application.

In addition, an embodiment of the present invention further provides a software product. The software product includes a computer instruction for implementing a logical channel scheduling method. The computer instruction may be stored in a readable storage medium. The processor may read the computer instruction from the readable storage medium and execute the computer instruction, so that the processor implements the logical channel scheduling method.

For detailed descriptions of the second aspect to the eleventh aspect of this application and various implementations of the second aspect to the eleventh aspect, refer to detailed descriptions of the first aspect and various implementations of the first aspect. In addition, for beneficial effects of the second aspect, the fifth aspect, the sixth aspect, and various implementations of the second aspect, the fifth aspect, and the sixth aspect, refer to analysis of beneficial effects of the first aspect and various implementations of the first aspect. For beneficial effects of the fourth aspect, the seventh aspect, the eighth aspect, and various implementations of the fourth aspect, the seventh aspect, and the eighth aspect, refer to analysis of beneficial effects of the third aspect and various implementations of the third aspect. For beneficial effects of the ninth aspect to the eleventh aspect and various implementations of the ninth aspect to the eleventh aspect, refer to the analysis of the beneficial effects of the first aspect or the third aspect and various implementations of the first aspect or the third aspect. Details are not described herein again.

DETAILED DESCRIPTION OF ILLUSTRATIVE EMBODIMENTS

Figure 1:
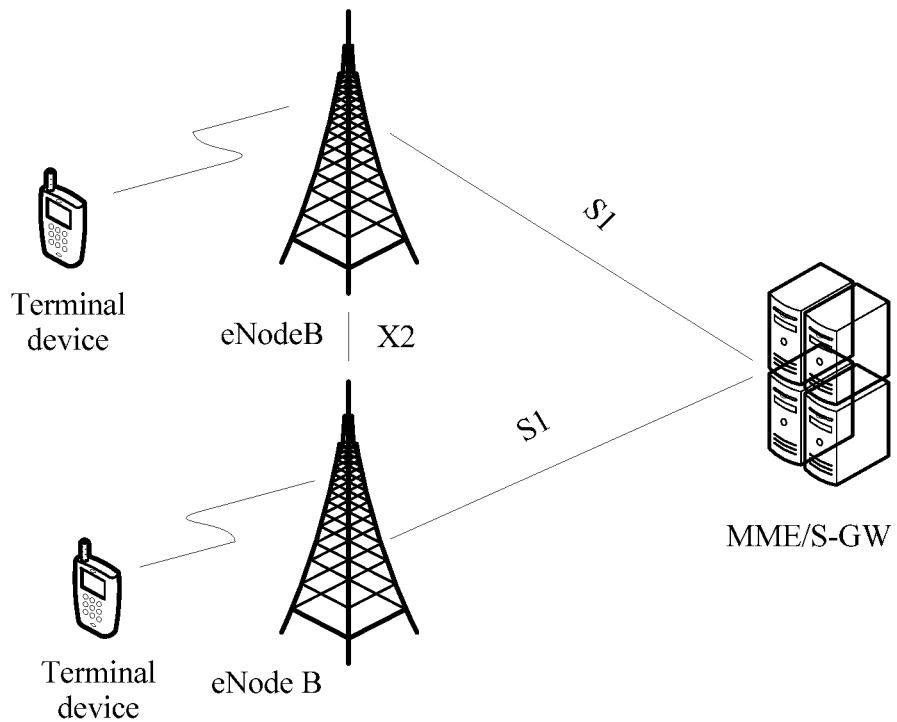
FIG. 1 is an architectural diagram of an LTE system according to an embodiment of the present invention.

In the following descriptions, for illustration rather than limitation, specific details such as a particular system structure, an interface, and a technology are provided to make a thorough understanding of this application. However, a person skilled in the art should know that this application can also be implemented in other embodiments without these specific details. In other cases, detailed descriptions of well-known apparatuses, circuits, and methods are avoided, so that this application is described without being obscured by unnecessary details.

In addition, terms "include" and "contain" and any variant thereof in the specification, claims, and accompanying drawings of the embodiments of the present invention are intended to cover inclusive containing. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments of the present invention may be implemented as processes (methods) implemented by a computer, a computing system, or a product such as a computer program product or a computer readable medium. The computer program product may be a computer storage medium that is readable to a computer system and that stores a computer program including an instruction used to enable a computer or the computing system to perform an example process. The computer readable storage medium is a non-transitory computer readable storage device. For example, the computer readable storage medium may be implemented by using one or more of a volatile computer memory, a non-volatile memory, a hard disk drive, a flash drive, a floppy disk, a compact disc, and a similar medium.

The term "and/or" in the embodiments of the present invention describes only an association relationship for describing associated objects and represents that three relationships may exist. For example, A and/or B may represent the following three cases: Only A exists, both A and B exist, and only B exists.

Moreover, in the specification, claims, and accompanying drawings of the present invention, the terms "first", "second", and so on are intended to distinguish between different objects but do not indicate a particular order.

The technical solutions provided in the embodiments of the present invention may be applied to various communications systems, such as a second generation mobile communications technology (2G) communications system, a third Generation mobile communications technology (3G) communications system, and a fourth generation mobile communications technology (4G) communications system, and a next-generation communications system, for example, the 2G system such as the Global System for Mobile Communications (GSM), the 3G system such as a Code Division Multiple Access (CDMA) system, a Time Division Multiple Access (TDMA) system, or a Wideband Code Division Multiple Access (WCDMA) system, the 4G system such as a Long Term Evolution (LTE) system, an LTE-Advanced communications system, or another similar communications system.

The LTE system is used as an example. FIG. 1 is an architectural diagram of an LTE system according to an embodiment of the present invention. The LTE system includes three network elements: a terminal device, an evolved packet core (EPC) device, and an evolved NodeB (eNode B). The EPC device is responsible for a core network part, and includes a mobility management entity (MME) and a serving gateway (S-GW). The MME processes signaling, and the S-GW processes data. The eNode B is responsible for an access network part, and an access network is also referred to as an evolved universal terrestrial radio access network (E-UTRAN). A logical channel scheduling method provided in the present invention is performed between the eNode B and the terminal device.

Figure 2:
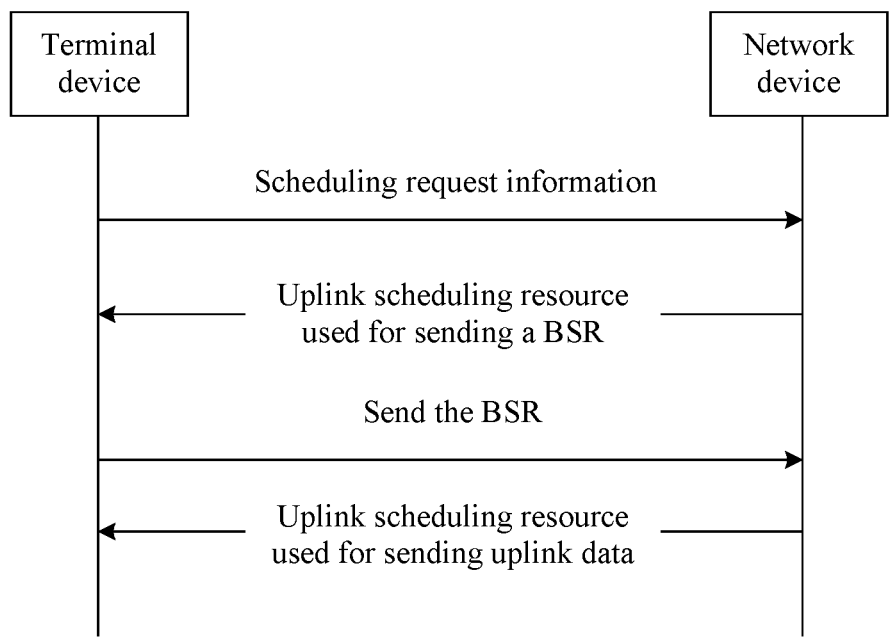
FIG. 2 is a schematic flowchart of LTE scheduling according to an embodiment of the present invention.

As shown in FIG. 2, before an existing terminal device sends uplink data to a network device, the terminal device first sends scheduling request information to the network device. The network device subsequently sends, to the terminal device, an uplink scheduling resource used for sending a buffer status report (BSR). After receiving the uplink scheduling resource used for sending the BSR, the terminal device sends the BSR on the uplink scheduling resource. Finally, the network device sends, to the terminal device, an uplink scheduling resource used for sending the uplink data. Because a total quantity of uplink scheduling resources used for sending the uplink data is determined, the terminal device needs to determine, according to a specific rule, a quantity of uplink scheduling resources that can be allocated to each logical channel. Usually, the terminal device determines, based on a PBR scheduled for the logical channel or an LCP scheduled for the logical channel by using a token bucket algorithm, the quantity of uplink scheduling resources that can be allocated to each logical channel. The token bucket algorithm is one of the most commonly used algorithms in network traffic shaping and rate limiting, is used to control an amount of data sent to a network, and allows burst data transmission.

Figure 3:
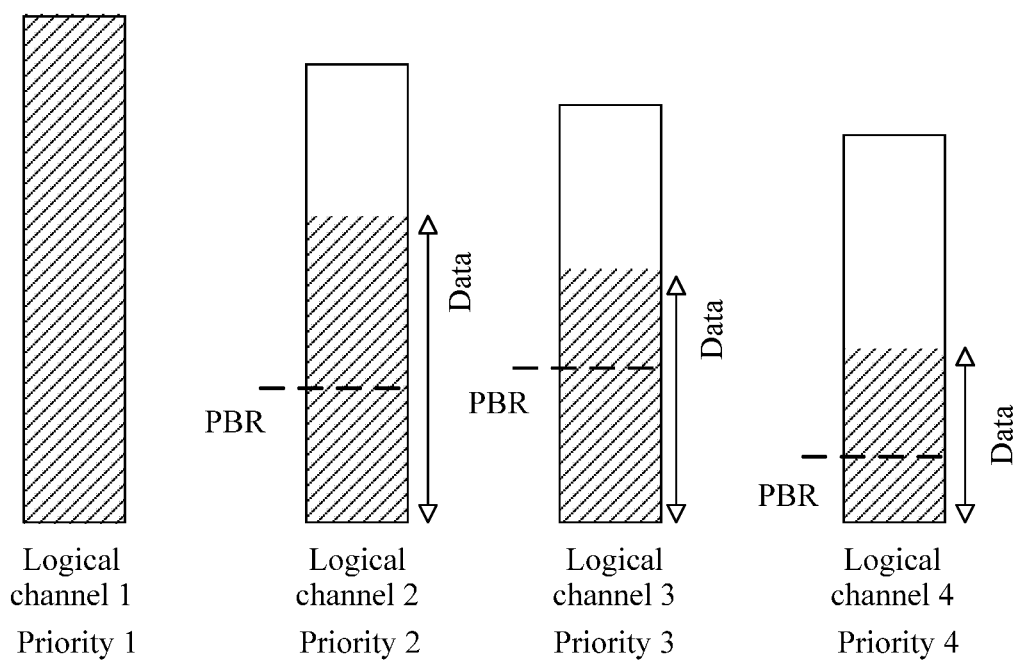
FIG. 3 is a diagram of a relationship between a priority, a PBR, and a buffer of a logical channel according to an embodiment of the present invention.

However, as shown in FIG. 3, it is assumed that there are four logical channel priorities in a terminal device, a smaller value of an LCP is corresponding to a higher priority, and different priorities are corresponding to different values of PBRs scheduled for logical channels (to be specific, the four logical channel priorities in FIG. 3 sequentially decrease from left to right). A URLLC service has a relatively high requirement on a service latency and service reliability. Therefore, it is assumed that a high priority 1 is configured for the URLLC service, and the PBR is set to infinity. In other words, a logical channel that has a lower priority than this logical channel is considered only after a resource of this logical channel is satisfied. This manner can preferentially ensure uplink transmission of URLLC, but causes buffer accumulation of another logical channel with a low priority. Once a logical channel with a low priority gets a scheduling opportunity, an uplink scheduling resource (for example, resources below dashed lines corresponding to a priority 2, a priority 3, and a priority 4) allocated to the logical channel cannot satisfy a requirement of scheduling a buffer (for example, resources shown in shadow regions corresponding to the priority 2, the priority 3, and the priority 4) on the logical channel. In this case, the terminal device needs to modify a PBR of the logical channel in an RRC reconfiguration process. If a PBR is modified each time, the logical channel may miss scheduling time. In addition, modifying a logical channel configuration of the logical channel in the RRC reconfiguration process generates a relatively large amount of RRC signaling, affecting performance of the terminal device.

In the logical channel scheduling method provided in the embodiments of the present invention, an uplink scheduling resource can be properly allocated to a logical channel of the terminal device, thereby ensuring that a logical channel configuration of the logical channel conforms to a real-time scheduling requirement, reducing RRC signaling, and improving performance of the terminal device.

A network device described in the embodiments of the present invention may be a base station, or may be a network device such as a router, a gateway, or a mobility management entity. The terminal device may be a wireless terminal or a wired terminal. The wireless terminal may be a device providing voice and/or data connectivity for a user, a handheld device with a wireless connection function, or another processing device connected to a wireless modem. The wireless terminal may communicate with another apparatus through Wi-Fi, Bluetooth, infrared and radio access networks (for example, RAN, radio access network), or the like. The wireless terminal may be a mobile terminal such as a mobile phone (or referred to as a "cellular" phone) or a computer having a mobile terminal, for example, may be a portable, pocket-sized, handheld, computer built-in, or in-vehicle mobile apparatus that exchanges voice and/or data with a radio access network. The wireless terminal may also be referred to as a system, a subscriber unit, a subscriber station, a mobile station, a mobile console, a remote station, an access point, a remote terminal, an access terminal, a user terminal, a user agent, or user equipment.

Figure 4:
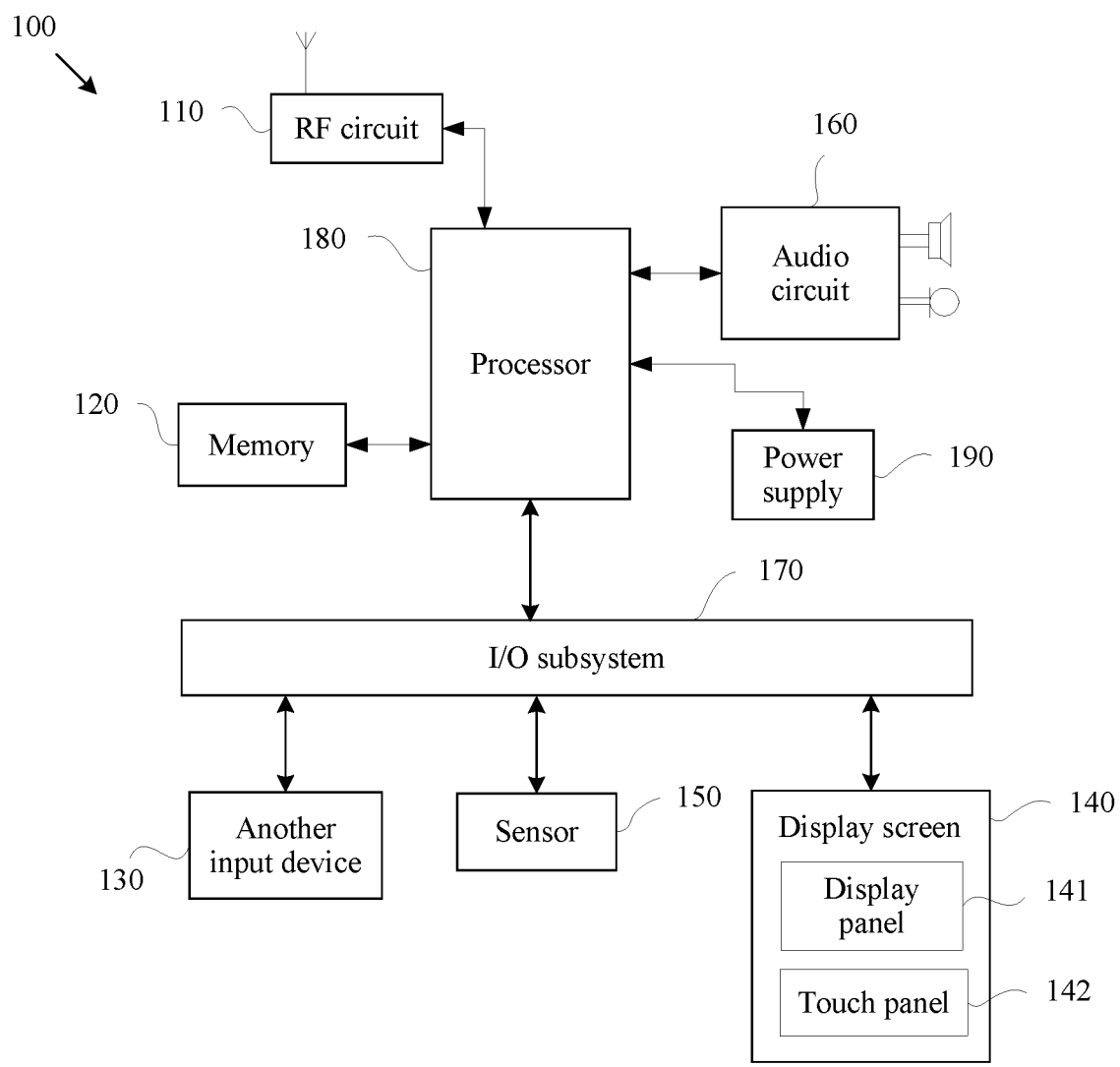
FIG. 4 is a diagram of a commodity hardware architecture of a smartphone according to an embodiment of the present invention.

For example, a smartphone is used as the terminal device, to describe a commodity hardware architecture of the smartphone. As shown in FIG. 4, a smartphone 100 includes components such as a radio frequency (RF) circuit 110, a memory 120, another input device 130, a display screen 140, a sensor 150, an audio circuit 160, an I/O subsystem 170, a processor 180, and a power supply 190. A person skilled in the art may understand that a structure of the smartphone 100 shown in FIG. 4 does not constitute any limitation on the mobile phone, and may include more or fewer components than those shown in the figure, or a combination of some components, or division of some components, or a different arrangement of the components. A person skilled in the art may understand that the display screen 140 is a user interface (UI), and the smartphone 100 may include more or fewer components than those shown in the figure. Although not shown, the smartphone 100 may further include a camera, a Bluetooth module, and the like. Details are not described herein.

Further, the processor 180 is connected to all of the RF circuit 110, the memory 120, the audio circuit 160, the I/O subsystem 170, and the power supply 190. The I/O subsystem 170 is connected to all of the another input device 130, the display screen 140, and the sensor 150. The RF circuit 110 may be configured to receive and send signals in information sending and receiving processes or a calling process, and particularly, after receiving downlink information of a base station, send the downlink information to the processor 180 for processing. The memory 120 may be configured to store a software program and a module. The processor 180 runs the software program and the module that are stored in the memory 120, to perform various function applications and data processing of the smartphone 1000. The another input device 130 may be configured to receive input digital or character information, and generate a key signal input related to a user setting and function control of the smartphone 100. The display screen 140 may be configured to display information entered by a user or information provided for a user and various menus of the smartphone 100, and may further receive user input. The sensor 150 may be an optical sensor, a motion sensor, or another sensor. The audio circuit 160 may provide an audio interface between a user and the smartphone 100. The I/O subsystem 170 is configured to control an input/output external device, and may include a controller for another input device, a sensor controller, or a display controller. The processor 180 is a control center of the smartphone 100, connects various parts of the entire mobile phone by using various interfaces and lines, and performs various functions and data processing of the smartphone 100 by running or executing the software program and/or the module that are/is stored in the memory 120 and by invoking data stored in the memory 120, so as to perform overall monitoring on the mobile phone. The power supply 190 (for example, a battery) is configured to supply power to the foregoing components. Preferably, the power supply may be logically connected to the processor 180 by using a power management system, to implement functions such as charging, discharging, and power consumption management by using the power supply management system.

Figure 5:
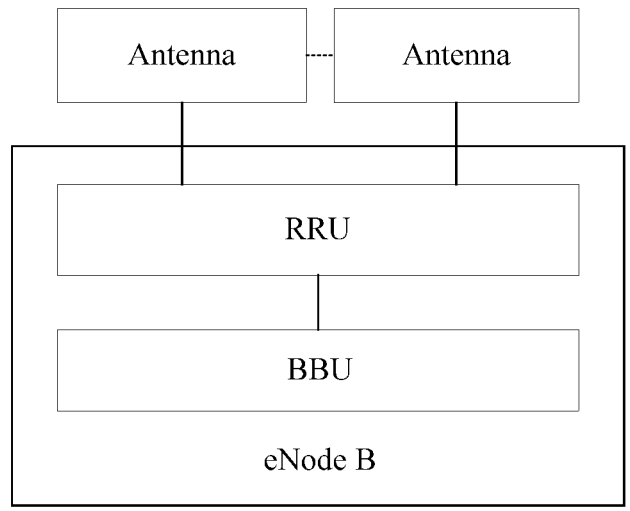
FIG. 5 is a diagram of a commodity hardware architecture of an eNode B according to an embodiment of the present invention.

For another example, an eNode B is used as the network device, to describe a commodity hardware architecture of the eNode B. As shown in FIG. 5, the eNode B may include a building baseband unit (BBU) and a remote radio unit (RRU). The RRU is connected to an antenna system (an antenna). The BBU and RRU may be separately used depending on requirements.

It should be noted that in the embodiments of the present invention, an indication of a PBR scheduled for a logical channel represents an update indication of the PBR scheduled for the logical channel, an indication of an LCP represents an update indication of the LCP, and the RRC reconfiguration message below is an RRC message. In other words, the RRC reconfiguration message may be referred to as an RRC message.

Figure 6:
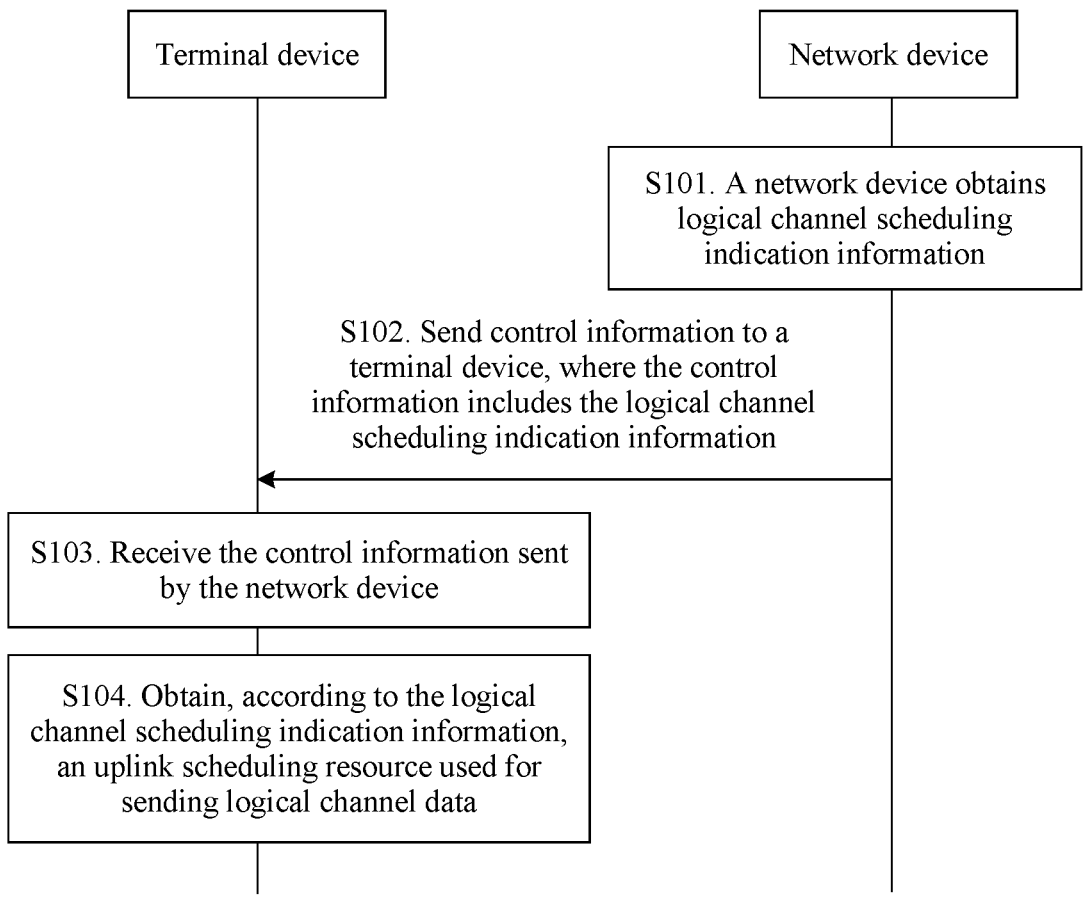
FIG. 6 is a schematic flowchart 1 of a logical channel scheduling method according to an embodiment of the present invention.

An embodiment of the present invention provides a logical channel scheduling method. As shown in FIG. 6, the method includes S101 to S104.

S101. A network device obtains logical channel scheduling indication information, where the logical channel scheduling indication information is any one of the following, including an indication that a resource is used by a logical channel separately, an indication of a PBR scheduled for the logical channel, and an indication of an LCP scheduled for the logical channel.

It should be noted that the indication that a resource is used by a logical channel separately indicates that the logical channel does not support multiplexing. The indication of the PBR scheduled for the logical channel is a variation rule of the PBR scheduled for the logical channel of a terminal device. The indication of the LCP is a variation rule of the LCP of the terminal device.

According to the logical channel scheduling method provided in this embodiment of the present invention, an uplink scheduling resource can be properly allocated to the logical channel of the terminal device from two different perspectives, thereby ensuring that a logical channel configuration of the logical channel conforms to a real-time scheduling requirement. From one perspective, the network device allocates, to the logical channel, a specific quantity of uplink scheduling resources that can be used separately, and from the other perspective, the indication that is of the PBR scheduled for the logical channel and that is sent by the network device or the indication that is of the LCP and that is sent by the network device is used, so that the terminal device adjusts, according to the foregoing indication, the PBR that is inside the terminal device and that is scheduled for the logical channel or the LCP scheduled for the logical channel inside the terminal device, replaces an old PBR that is inside the terminal device and that is scheduled for the logical channel or an old LCP inside the terminal device with the adjusted PBR scheduled for the logical channel or the adjusted LCP scheduled for the logical channel, and allocates the uplink scheduling resource to the logical channel by using the new PBR scheduled for the logical channel or the new LCP scheduled for the logical channel.

It should also be noted that the logical channel scheduling indication information mentioned in this embodiment of the present invention may be the indication that the logical channel does not support multiplexing and that a resource is used by the logical channel separately, that is, indicate that the network device allocates, to the logical channel, an uplink scheduling resource that can be used separately. Both the PBR scheduled for the logical channel and the LCP scheduled for the logical channel that are mentioned in this embodiment of the present invention are logical channel configurations, and are bases for the terminal device to allocate the uplink scheduling resource to the logical channel.

It should be further understood that the network device may determine, based on a variety of status information sent by the terminal device, whether the logical channel scheduling indication information needs to be obtained, or may receive a request message sent by the terminal device, and obtain the logical channel scheduling indication information according to the request message. This is not limited in the present invention.

S102. The network device sends control information to a terminal device, where the control information includes the logical channel scheduling indication information.

It should be noted that a specific method used by the network device to send the control information to the terminal device may be adding, by the network device, the control information to a control message, and sending the control message to the terminal device. If the logical channel scheduling indication information is the indication that a resource is used by a logical channel separately, the control message is a Radio Resource Control RRC reconfiguration message. If the logical channel scheduling indication information is the indication of the PBR scheduled for the logical channel or the indication of the LCP scheduled for the logical channel, the control message may be a physical downlink control channel PDCCH or a Medium Access Control control element MAC CE. Particularly, if the logical channel scheduling indication information is the indication of the PBR scheduled for the logical channel or the indication of the LCP scheduled for the logical channel, compared with a conventional RRC reconfiguration process, the logical channel scheduling indication information is sent by using the control message, so as to omit an RRC reconfiguration process required by the logical channel configuration, thereby improving transmission performance of the terminal device while reducing RRC signaling overheads.

S103. The terminal device receives the control information sent by the network device.

In this embodiment of the present invention, a specific method used by the terminal device to receive the control information sent by the network device may be receiving, by the terminal device, the control message that is sent by the network device and that carries the control information, and parsing the control message to obtain the control information, that is, to obtain the logical channel scheduling indication information.

S104. The terminal device obtains, according to the logical channel scheduling indication information, an uplink scheduling resource used for sending logical channel data.

Further, the logical channel scheduling indication information mentioned in this embodiment of the present invention is scrambled by using a radio network temporary identifier (RNTI) of the logical channel corresponding to the logical channel scheduling indication information or by using a dedicated RNTI of a radio bearer. After receiving the control information sent by the network device, the terminal device descrambles the scrambled logical channel scheduling indication information, to learn of a specific logical channel, corresponding to the logical channel scheduling indication information, of the terminal device.

It should be noted that in this embodiment of the present invention, the uplink scheduling resource used for sending the logical channel data may also be referred to as an uplink data sending resource of the logical channel, and is used to send uplink data of the logical channel.

The following details step S102 and step S103 and step S104 that are corresponding to step S102.

Figure 7:
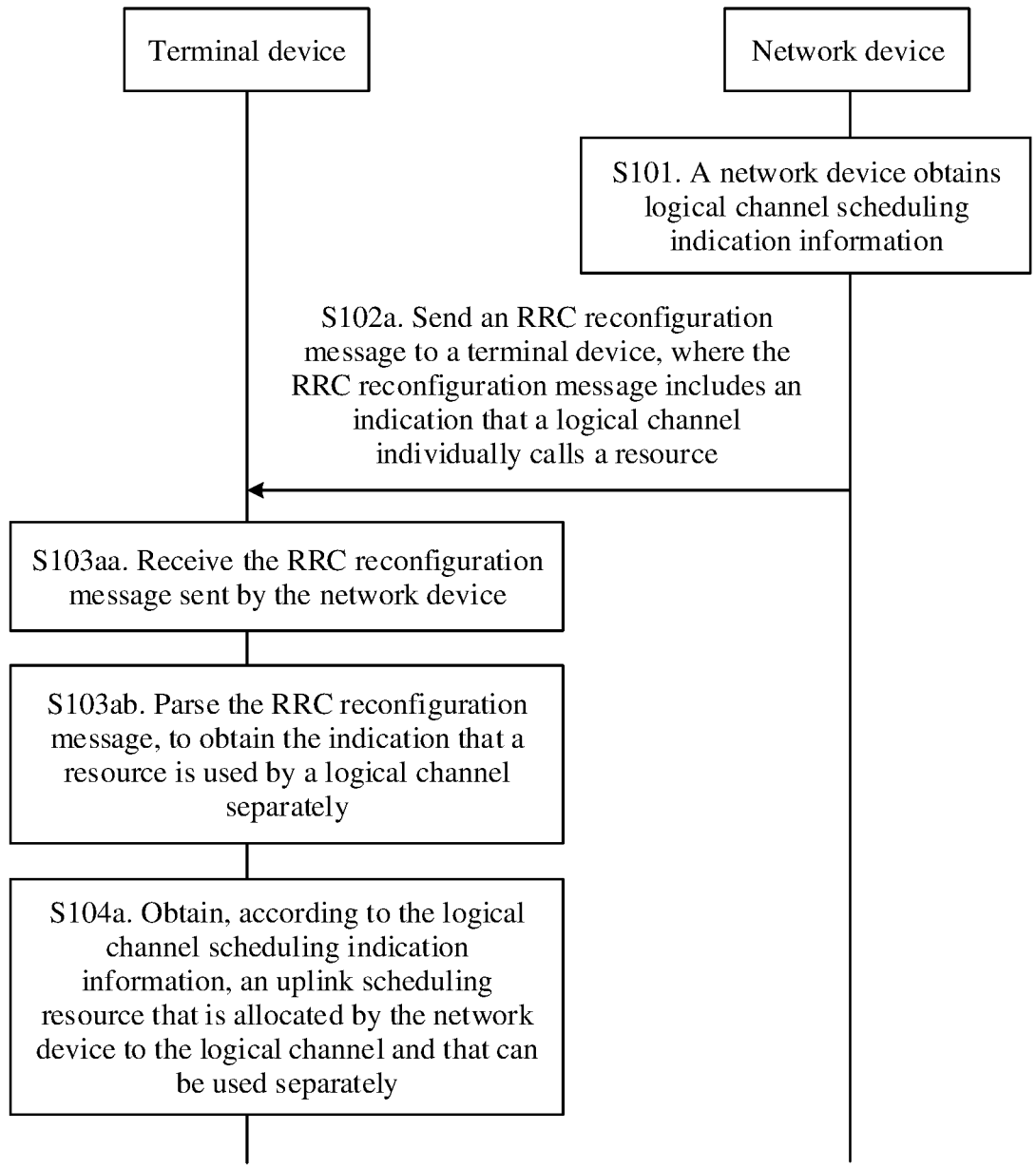
FIG. 7 is a schematic flowchart 2 of a logical channel scheduling method according to an embodiment of the present invention.

Specifically, as shown in FIG. 7, when the logical channel scheduling indication information is the indication that a resource is used by a logical channel separately, step S12 may include step S102a.

S102a. The network device sends an RRC reconfiguration message to a terminal device, where the RRC reconfiguration message includes the indication that a resource is used by a logical channel separately.

For example, the indication that a resource is used by a logical channel separately may be an information element (IE) such as a logical channel multiplexing mask r15 logical channel-multiplexing-mask-r15.

It should be noted that, in this embodiment of the present invention, the RRC reconfiguration message may alternatively be another RRC message sent by the network device to the terminal device. This is not limited herein.

Correspondingly, step S103 may specifically include steps S103aa and S103ab.

S103aa. The terminal device receives the RRC reconfiguration message sent by the network device.

S103ab. The terminal device parses the RRC reconfiguration message, to obtain the indication that a resource is used by a logical channel separately.

After receiving the RRC reconfiguration message sent by the network device, the terminal device parses the RRC reconfiguration message, to obtain the indication that a resource is used by a logical channel separately, and determines that the indication that a resource is used by a logical channel separately indicates that the logical channel does not support multiplexing.

It should be noted that if an information element included in the RRC reconfiguration message indicates that the logical channel supports multiplexing, the uplink scheduling resource is allocated to the logical channel by using a conventional token bucket algorithm. This is not limited in the present invention.

In addition, step 104 may include step S104a.

S104a. The terminal device obtains, according to the logical channel scheduling indication information, an uplink scheduling resource that is allocated by the network device to the logical channel and that can be used separately.

If the logical channel scheduling indication information is the indication that a resource is used by a logical channel separately, after the terminal device determines that the indication that a resource is used by a logical channel separately indicates that the logical channel does not support multiplexing, the terminal device can obtain, according to the logical channel scheduling indication information and by listening on a PDCCH, the uplink scheduling resource that is allocated by the network device to the logical channel and that can be used separately, so that the logical channel can send the uplink data to the network device by using the allocated uplink scheduling resource that can be used separately.

Figure 8:
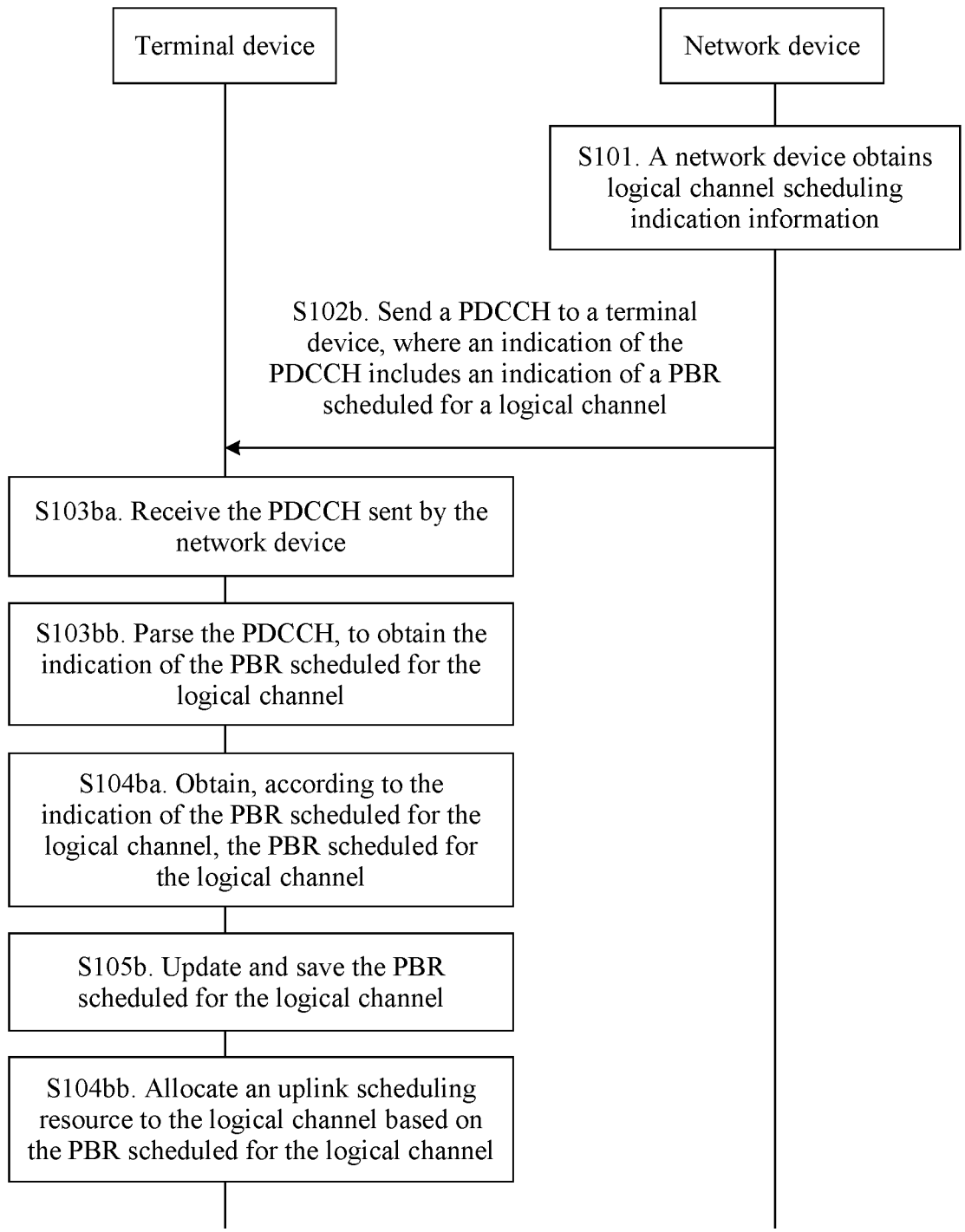
FIG. 8 is a schematic flowchart 3 of a logical channel scheduling method according to an embodiment of the present invention.

Specifically, as shown in FIG. 8, when the logical channel scheduling indication information is the indication of the PBR scheduled for the logical channel, step S102 may specifically include step S102b.

S102b. The network device sends a PDCCH to a terminal device, where an indication of the PDCCH includes the indication of the PBR scheduled for the logical channel.

Correspondingly, step S103 may specifically include steps S103ba and S103bb.

S103ba. The terminal device receives the PDCCH sent by the network device.

S103bb. The terminal device parses the PDCCH, to obtain the indication of the PBR scheduled for the logical channel.

In addition, step S104 may include steps S104ba and S104bb.

S104ba. The terminal device obtains, according to the indication of the PBR scheduled for the logical channel, the PBR scheduled for the logical channel.

Specifically, the indication of the PBR scheduled for the logical channel is a variation rule of the PBR scheduled for the logical channel. The obtaining, by the terminal device according to the indication of the PBR scheduled for the logical channel, the PBR scheduled for the logical channel may be specifically adjusting, by the terminal device according to the variation rule of the PBR scheduled for the logical channel, the PBR scheduled for the logical channel.

Particularly, for a logical channel of a URLLC service, a value of a PBR scheduled for the logical channel may be infinity, and this indicates that the URLLC service has a highest priority.

Further, a length of the indication of the PBR scheduled for the logical channel is one bit or two bits.

This may be configured depending on actual use requirements, and is not limited in this embodiment of the present invention.

In a first possible implementation, using a binary system as an example, when the length of the indication of the PBR is one bit, the indication of the PBR being 0 indicates that the PBR of the logical channel remains unchanged (in other words, the PBR is still an old PBR inside the terminal device), and the indication of the PBR being 1 indicates that the PBR of the logical channel is set to infinity.

In a second possible implementation, using a binary system as an example, when the length of the indication of the PBR is one bit, the indication of the PBR being 0 indicates that the PBR of the logical channel is increased to a next value range, and the indication of the PBR being 1 indicates that the PBR of the logical channel is decreased to a next value range.

In a third possible implementation, using a binary system as an example, when the length of the indication of the PBR is two bits, the indication of the PBR being 00 indicates that the PBR of the logical channel is adjusted to 25% of an old PBR inside the terminal device, the indication of the PBR being 01 indicates that the PBR of the logical channel is adjusted to 50% of the old PBR inside the terminal device, the indication of the PBR being 10 indicates that the PBR of the logical channel is adjusted to 100% of the old PBR inside the terminal device, and the indication of the PBR being 11 indicates that the PBR of the logical channel is adjusted to 200% of the old PBR inside the terminal device.

It may be understood that the three possible implementations described above are merely implementable manners in this embodiment of the present invention, and an indication, with another length, of the PBR scheduled for the logical channel and another variation rule of the PBR scheduled for the logical channel also fall within the protection scope of the present invention. Details are not described herein.

Optionally, because when decoding the PDCCH, the terminal device can learn a specific logical channel to which the PDCCH belongs. Therefore, the PDCCH may not carry a logical channel number, as listed in Table 2.

TABLE 1

| Length (bit) | Function |
| --- | --- |
| 1 | Format markup: Format 0 or Format 1A |
| 1 | Frequency hopping markup: frequency hopping or no frequency hopping |
| . . . | . . . |
| 5 | Modulation and coding scheme |
| 1 | New data indication |
| 4 | Logical channel number |
| 1 or 2 | Indication of a PBR scheduled for a logical channel |
| 2 | Uplink power control (physical uplink shared channel) |
| 3 | Cyclic shift of a terminal-based reference signal DM RS |
| 2 | Uplink index: time division duplex |
| 2 | Downlink allocation index: time division duplex |
| 1 | Channel quality indicator response |

Table 1 shows an example of an indication of a PDCCH provided in this embodiment of the present invention. The indication of the PDCCH includes the logical channel number occupying four bits and the indication of the PBR scheduled for the logical channel that occupies one bit or two bits.

It should be noted that, in this embodiment of the present invention, the logical channel number in the indication of the PDCCH may occupy another quantity of bits. For example, the logical channel number may occupy six bits or five bits.

TABLE 2

| Length (bit) | Function |
| --- | --- |
| 1 | Format markup: Format 0 or Format 1A |
| 1 | Frequency hopping markup: frequency hopping or no frequency hopping |
| . . . | . . . |
| 5 | Modulation and coding scheme |
| 1 | New data indication |
| 1 or 2 | Indication of a PBR scheduled for a logical channel |
| 2 | Uplink power control (physical uplink shared channel) |
| 3 | Cyclic shift of a terminal-based reference signal DM RS |
| 2 | Uplink index: time division duplex |
| 2 | Downlink allocation index: time division duplex |
| 1 | Channel quality indicator response |

S104bb. The terminal device allocates an uplink scheduling resource to the logical channel based on the PBR scheduled for the logical channel.

Optionally, after step S104ba is performed, this embodiment of the present invention further includes step S105b.

S105b. The terminal device updates and stores the PBR scheduled for the logical channel.

It should be noted that there is no sequence between step S105b and step S104bb. When performing the logical channel scheduling method provided in this embodiment of the present invention, the terminal device can first update and store the PBR scheduled for the logical channel, or can first allocate, based on the PBR scheduled for the logical channel, the uplink scheduling resource to the logical channel. This is not specifically limited in the present invention.

In a possible implementation, the indication of the PDCCH may not include the PBR scheduled for the logical channel. Another bit in the PDCCH may implicitly indicate the variation rule of the PBR scheduled for the logical channel. For example, the channel quality indicator response in Table 1 may implicitly indicate the PBR scheduled for the logical channel. In other words, there is a mapping relationship between the channel quality indicator response and the variation rule of the PBR scheduled for the logical channel. The terminal device may obtain, according to an implicit indication of the channel quality indicator response in the indication that is of the PDCCH and that is received by the terminal device, the PBR scheduled for the logical channel.

Figure 9:
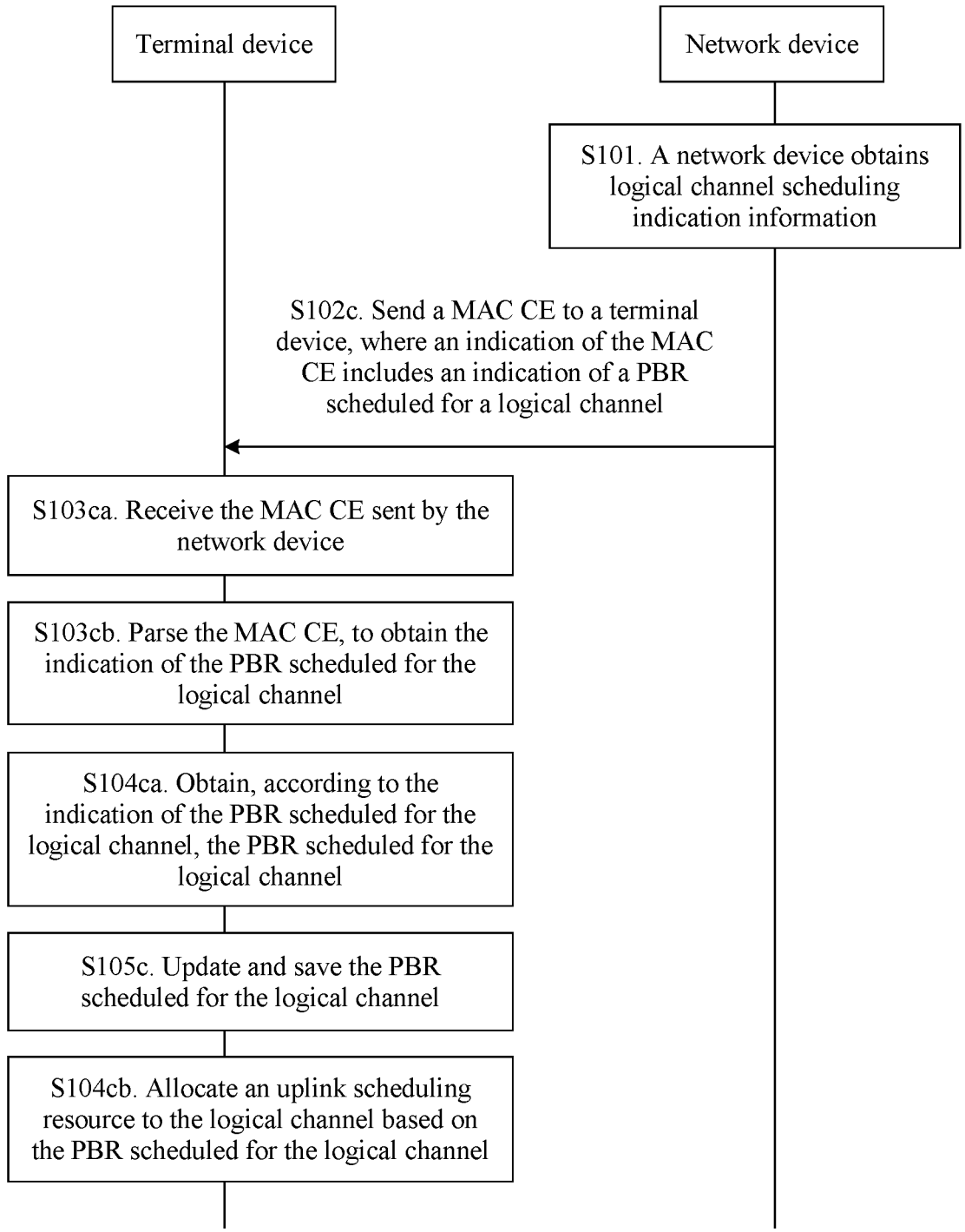
FIG. 9 is a schematic flowchart 4 of a logical channel scheduling method according to an embodiment of the present invention.

Specifically, as shown in FIG. 9, when the logical channel scheduling indication information is the indication of the PBR scheduled for the logical channel, step S102 may specifically include step S102c.

S102c. The network device sends a MAC CE to a terminal device, where an indication of the MAC CE includes the indication of the PBR scheduled for the logical channel.

Correspondingly, step S103 may specifically include steps S103ca and S103cb.

S103ca. The terminal device receives the MAC CE sent by the network device.

S103cb. The terminal device parses the MAC CE, to obtain the indication of the PBR scheduled for the logical channel.

In addition, step S104 may include steps S104ca and S104cb.

S104ca. The terminal device obtains, according to the indication of the PBR scheduled for the logical channel, the PBR scheduled for the logical channel.

Particularly, for a logical channel of a URLLC service, a value of a PBR scheduled for the logical channel may be infinity, and this indicates that the URLLC service has a highest priority.

Further, a length of the indication of the PBR scheduled for the logical channel is one bit or two bits.

Figure 10:
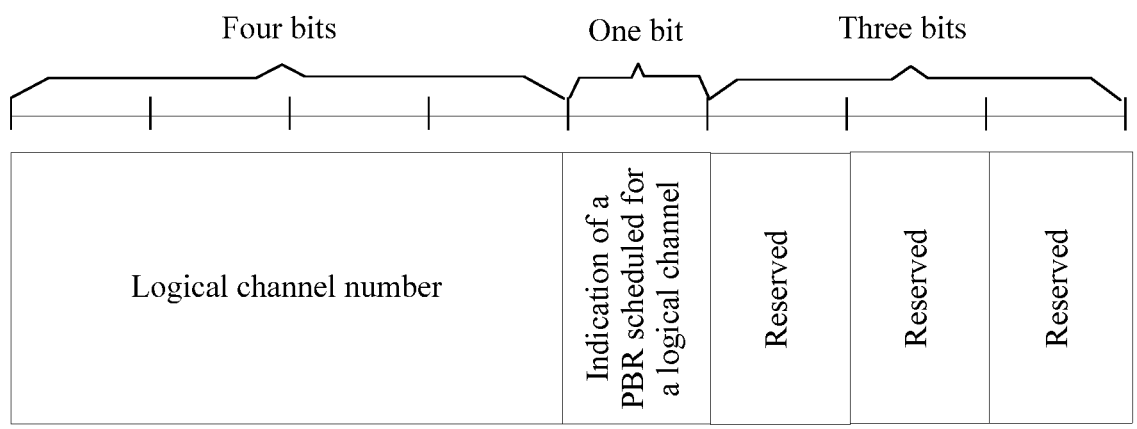
FIG. 10 is a schematic diagram 1 of an indication of a MAC CE according to an embodiment of the present invention.
Figure 11:
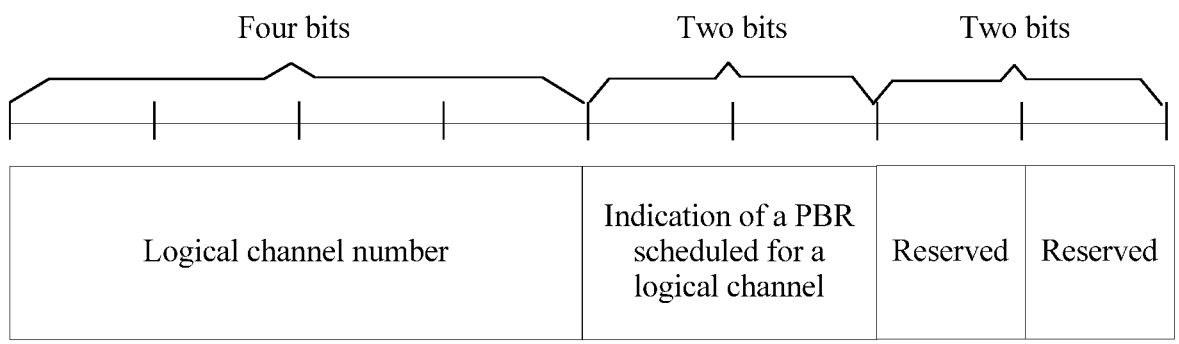
FIG. 11 is a schematic diagram 2 of an indication of a MAC CE according to an embodiment of the present invention.

FIG. 10 shows an example of an indication of a MAC CE according to an embodiment of the present invention. The indication of the MAC CE includes a logical channel number occupying four bits, an indication of a PBR scheduled for a logical channel that occupies one bit, and three reserved bits. FIG. 11 shows an example of another indication of a MAC CE according to an embodiment of the present invention. The indication of the MAC CE includes a logical channel number occupying four bits, an indication of a PBR that occupies two bits, and two reserved bits. A length of the indication of the PBR and a variation rule of the PBR are the same as those in the three possible implementations in step S104ba. For brevity, details are not described herein again. In FIG. 10 and FIG. 11, the logical channel number may occupy another quantity of bits. In examples in FIG. 10 and FIG. 11, the logical channel number occupies four bits.

S104cb. The terminal device allocates an uplink scheduling resource to the logical channel based on the PBR scheduled for the logical channel.

Optionally, after step S104ca is performed, this embodiment of the present invention further includes step S105c.

S105c. The terminal device updates and stores the PBR scheduled for the logical channel.

Likewise, there is no sequence between step S105c and step S104cb.

Optionally, the RRC reconfiguration message sent by the network device to the terminal device may further include an initial PBR scheduled for the logical channel. In this way, in a process in which the terminal device obtains, for the first time according to the indication of the PBR of the logical channel, the PBR scheduled for the logical channel, the terminal device may adjust, based on the initial PBR scheduled for the logical channel in the RRC reconfiguration message and according to the indication of the PBR scheduled for the logical channel, the initial PBR scheduled for the logical channel to a new PBR scheduled for the logical channel. In other words, the terminal device adjusts, according to the variation rule of the PBR scheduled for the logical channel, the PBR scheduled for the logical channel.

Figure 12:
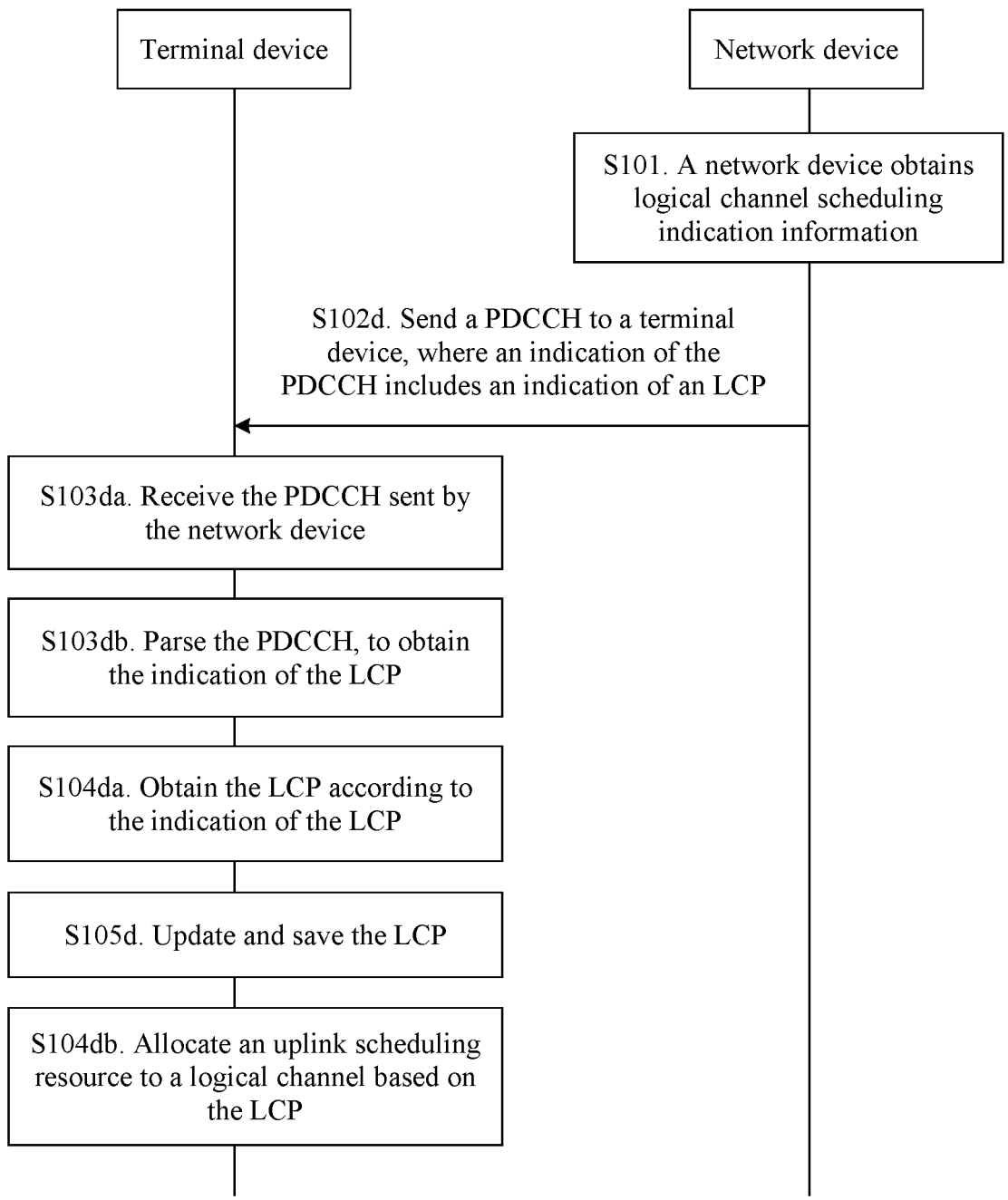
FIG. 12 is a schematic flowchart 5 of a logical channel scheduling method according to an embodiment of the present invention.

Specifically, as shown in FIG. 12, when the logical channel scheduling indication information is the indication of the LCP, step S102 may specifically include step S102d.

S102d. The network device sends a PDCCH to a terminal device, where an indication of the PDCCH includes the indication of the LCP.

Correspondingly, step S103 may specifically include steps S103da and S103db.

S103da. The terminal device receives the PDCCH sent by the network device.

S103db. The terminal device parses the PDCCH, to obtain the indication of the LCP.

In addition, step 104 may include steps S104da and S104db.

S104da. The terminal device obtains the LCP according to the indication of the LCP.

Specifically, the indication of the LCP is a variation rule of the LCP. The obtaining, by the terminal device, the LCP according to the indication of the LCP may be specifically adjusting, by the terminal device, the LCP according to the variation rule of the LCP.

Further, a length of the indication of the LCP is one bit or four bits.

TABLE 3

| Length (bit) | Function |
| --- | --- |
| 1 | Format markup: Format 0 or Format 1A |
| 1 | Frequency hopping markup: frequency hopping or no frequency hopping |
| ... | ... |
| 5 | Modulation and coding scheme |
| 1 | New data indication |
| 4 | Logical channel number |
| 1 or 4 | Indication of an LCP |
| 2 | Uplink power control (physical uplink shared channel) |
| 3 | Cyclic shift of a terminal-based reference signal DM RS |
| 2 | Uplink index: time division duplex |
| 2 | Downlink allocation index: time division duplex |
| 1 | Channel quality indicator response |

Table 3 shows an example of an indication of another PDCCH provided in this embodiment of the present invention. The indication of the PDCCH includes the logical channel number occupying four bits and the indication of the LCP that occupies one bit or four bits.

Same as the foregoing indication that is of the PDCCH and that includes the indication of the PBR, in the indication that is of the PDCCH and that includes the indication of the LCP, the logical channel number may occupy another quantity of bits. For example, the logical channel number may occupy six bits or five bits.

In a first possible implementation, using a binary system as an example, when the length of the indication of the LCP is one bit, the indication of the LCP being 0 indicates that the LCP of the logical channel is increased to a next value range, and the indication of the LCP being 1 indicates that the LCP of the logical channel is decreased to a next value range.

In a second possible implementation, using a binary system as an example, when the length of the indication of the LCP is four bits, a level of the LCP may be shown depending on an actual status.

It may be understood that the two possible implementations described above are merely implementable manners in this embodiment of the present invention, and an indication, with another length, of an LCP and another variation rule of the LCP also fall within the protection scope of the present invention. Details are not described herein.

S104db. The terminal device allocates an uplink scheduling resource to the logical channel based on the LCP.

Optionally, after step S104da is performed, this embodiment of the present invention further includes step S105d.

S105d. The terminal device updates and stores the LCP.

Likewise, there is no sequence between step S105d and step S104db.

Same as the foregoing PBR scheduled for the logical channel, in a possible implementation, the indication of the PDCCH may not include the LCP. Another bit in the PDCCH may implicitly indicate the variation rule of the LCP. For example, the channel quality indicator response in Table 1 may implicitly indicate the LCP. In other words, there is a mapping relationship between the channel quality indicator response and the variation rule of the LCP. The terminal device may obtain the LCP according to an implicit indication of the channel quality indicator response in the indication that is of the PDCCH and that is received by the terminal device.

Figure 13:
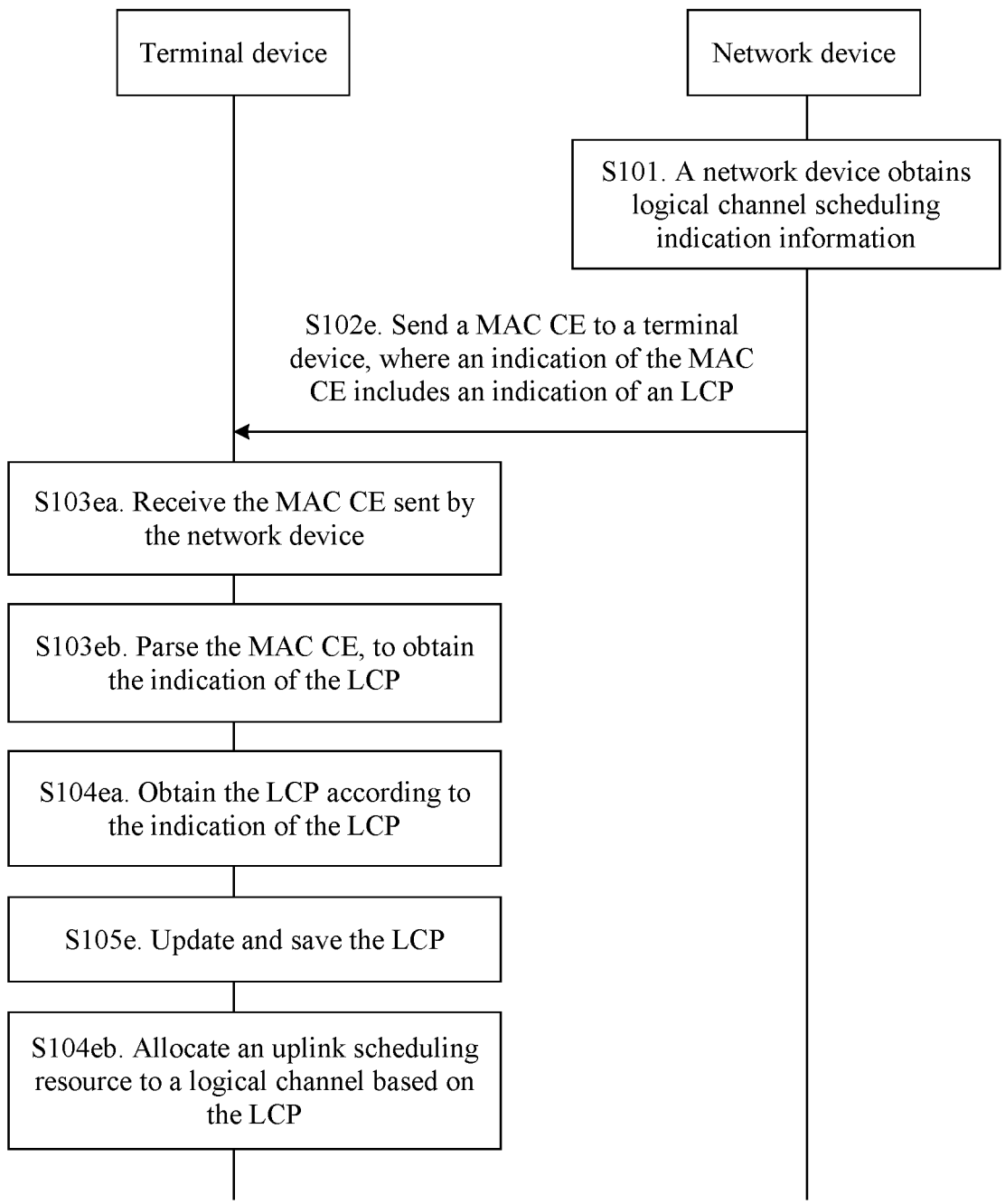
FIG. 13 is a schematic flowchart 6 of a logical channel scheduling method according to an embodiment of the present invention.

Specifically, as shown in FIG. 13, when the logical channel scheduling indication information is the indication of the LCP, step S102 may specifically include step S102e.

S102e. The network device sends a MAC CE to a terminal device, where an indication of the MAC CE includes the indication of the LCP.

Correspondingly, step S103 may specifically include steps S103ea and S103eb.

S103ea. The terminal device receives the MAC CE sent by the network device.

S103eb. The terminal device parses the MAC CE, to obtain the indication of the LCP.

In addition, step S104 may include steps S104ea and S104eb.

S104ea. The terminal device obtains the LCP according to the indication of the LCP.

Further, a length of the indication of the LCP is one bit or four bits.

Figure 14:
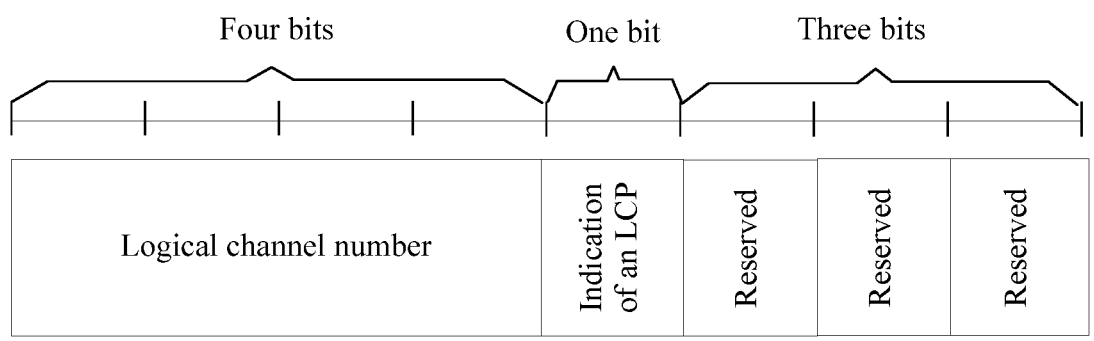
FIG. 14 is a schematic diagram 3 of an indication of a MAC CE according to an embodiment of the present invention.
Figure 15:
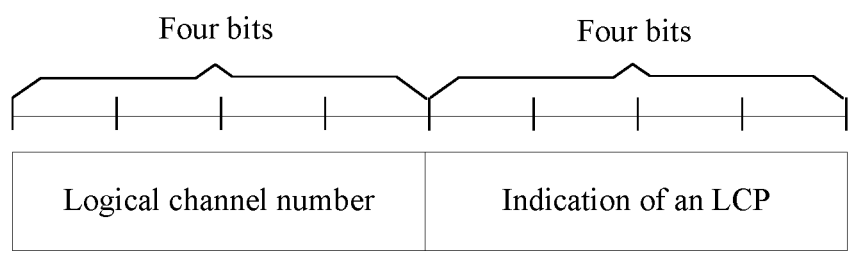
FIG. 15 is a schematic diagram 4 of an indication of a MAC CE according to an embodiment of the present invention.

FIG. 14 shows an indication of a MAC CE according to an embodiment of the present invention. The indication of the MAC CE includes a logical channel number occupying four bits, an indication of an LCP that occupies one bit, and three reserved bits. FIG. 15 also shows an indication of a MAC CE according to an embodiment of the present invention. The indication of the MAC CE includes a logical channel number occupying four bits and an indication of an LCP that occupies four bits. A value of the indication of the LCP and a variation rule of the LCP are the same as those in the two possible implementations in step S104da. For brevity, details are not described herein again. In FIG. 14 and FIG. 15, the logical channel number may occupy another quantity of bits. In examples in FIG. 14 and FIG. 15, the logical channel number occupies four bits.

S104eb. The terminal device allocates an uplink scheduling resource to the logical channel based on the LCP.

Optionally, the RRC reconfiguration message sent by the network device to the terminal device may further include an initial LCP. In this way, in a process in which the terminal device obtains, for the first time according to the indication of the LCP, the LCP scheduled for the logical channel, the terminal device may adjust the initial LCP to a new LCP based on the initial LCP in the RRC reconfiguration message and the indication of the LCP. In other words, the terminal device adjusts the LCP according to the variation rule of the LCP.

Optionally, after step S104ea is performed, this embodiment of the present invention further includes step S105e.

S105e. The terminal device updates and stores the LCP.

Likewise, there is no sequence between step S105e and step S104eb.

It should be noted that when the logical channel scheduling indication information is the PBR scheduled for the logical channel or the LCP scheduled for the logical channel, after the terminal device updates and stores the PBR scheduled for the logical channel or the LCP, the terminal device can allocate the uplink scheduling resource to the logical channel based on the stored PBR scheduled for the logical channel or the stored LCP scheduled for the logical channel. In addition, the step of updating the PBR scheduled for the logical channel or the LCP scheduled for the logical channel can ensure time validity of the PBR that is of the terminal device and that is scheduled for the logical channel or the LCP scheduled for the logical channel of the terminal device.

This embodiment of the present invention provides a logical channel scheduling method. The terminal device receives the control information sent by the network device, where the control information includes the logical channel scheduling indication information, and the logical channel scheduling indication information is any one of the following, including the indication that a resource is used by a logical channel separately, the indication of the prioritized bit rate PBR scheduled for the logical channel, and the indication of the logical channel priority LCP, and the terminal device obtains, according to the logical channel scheduling indication information, the uplink scheduling resource used for sending the logical channel data. Based on the foregoing descriptions of this embodiment, according to the logical channel scheduling method provided in this embodiment of the present invention, the terminal device can directly receive the control information sent by the network device, and the control information includes the indication that the logical channel does not support multiplexing and that a resource is used by the logical channel separately, the PBR scheduled for the logical channel, or the LCP scheduled for the logical channel, to obtain, by using the indication that the logical channel does not support multiplexing and that a resource is used by the logical channel separately, the PBR scheduled for the logical channel, or the LCP, the uplink scheduling resource used for sending the logical channel data. Compared with a conventional RRC reconfiguration process, dynamically sending the logical channel scheduling indication information to the terminal device ensures that a logical channel configuration satisfies a real-time scheduling requirement. In addition, in the logical channel scheduling indication method in which the indication of the PBR scheduled for the logical channel or the indication of the LCP scheduled for the logical channel is sent by using a control message, an RRC reconfiguration process required by the logical channel configuration is avoided, so that transmission performance of the terminal device is improved while RRC signaling overheads are reduced.

Figure 16:
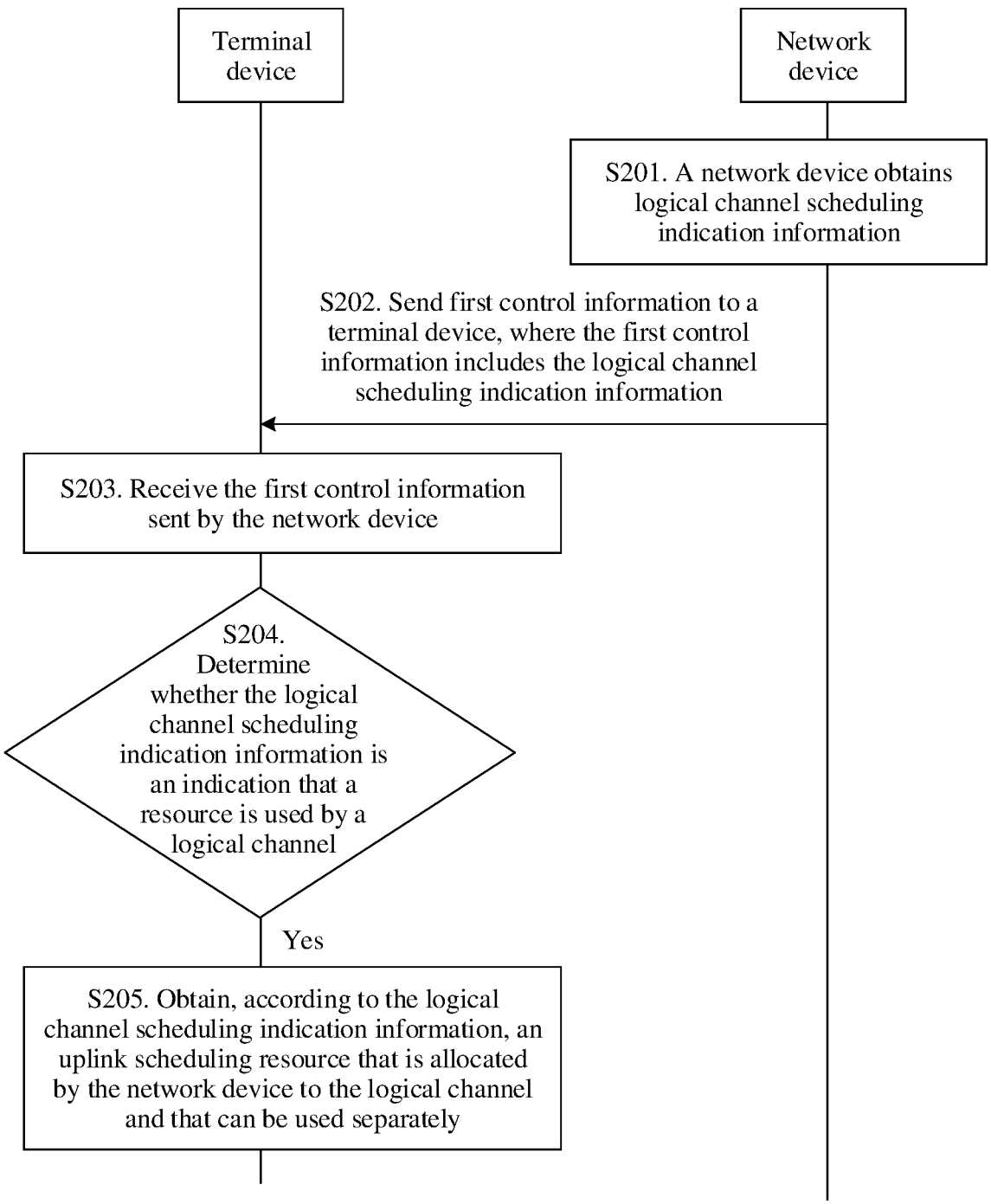
FIG. 16 is a schematic flowchart 1 of another logical channel scheduling method according to an embodiment of the present invention.

An embodiment of the present invention further provides a logical channel scheduling method. As shown in FIG. 16, the method includes S201 to S205.

S201. A network device obtains logical channel scheduling indication information, where the logical channel scheduling indication information is an indication that a resource is used by a logical channel separately or an indication that a resource is used by more than one logical channel.

It should be noted that the logical channel scheduling indication information is used to indicate whether the logical channel supports multiplexing. To be specific, the indication that a resource is used by a logical channel separately indicates that the logical channel does not support multiplexing, and the indication that a resource is used by more than one logical channel indicates that the logical channel supports multiplexing.

For example, the logical channel scheduling indication information may be a flag bit in first control information mentioned in the following embodiment. Using a binary system as an example, when the flag bit is 1, it indicates that the logical channel does not support multiplexing (that is, the indication that a resource is used by a logical channel separately), when the flag bit is 0, it indicates that the logical channel supports multiplexing (that is, the indication that a resource is used by more than one logical channel). It may be understood that the foregoing values of the flag bit are merely implementable manners of the present invention, and another value of the flag bit also falls within the protection scope of the present invention. This is not specifically limited in the present invention.

It should be further understood that the network device may determine, based on a variety of status information sent by a terminal device, whether the logical channel scheduling indication information needs to be obtained, or may receive a request message sent by a terminal device, and obtain the logical channel scheduling indication information according to the request message. This is not specifically limited in the present invention.

S202. The network device sends first control information to a terminal device, where the first control information includes the logical channel scheduling indication information.

Specifically, the first control information may be a Radio Resource Control RRC reconfiguration message, or may be another type of control information. This is not specifically limited in the present invention.

S203. The terminal device receives the first control information sent by the network device.

S204. The terminal device determines whether the logical channel scheduling indication information is the indication that a resource is used by a logical channel separately.

Specifically, for example, the first control information is the RRC reconfiguration message. After receiving the RRC reconfiguration message sent by the network device, the terminal device parses the RRC reconfiguration message to obtain the logical channel scheduling indication information, and determines whether the logical channel scheduling indication information is the indication that a resource is used by a logical channel separately. If the logical channel scheduling indication information is the indication that a resource is used by a logical channel separately, a procedure of the logical channel scheduling method provided in this embodiment of the present invention ends after the following step S205 is performed. If the logical channel scheduling indication information is the indication that a resource is used by more than one logical channel, a procedure of the logical channel scheduling method provided in this embodiment of the present invention ends after step S205 is skipped and steps S206 to S210 are performed.

S205. If the logical channel scheduling indication information is the indication that a resource is used by a logical channel separately, the terminal device obtains, according to the logical channel scheduling indication information, an uplink scheduling resource that is allocated by the network device to the logical channel and that can be used separately.

Further, the logical channel scheduling indication information mentioned in this embodiment of the present invention is scrambled by using an RNTI of the logical channel corresponding to the logical channel scheduling indication information or by using a dedicated RNTI of a radio bearer. For descriptions of scrambling, refer to the related descriptions of step S104 in the foregoing embodiment. For brevity, details are not described herein again.

Figure 17A:
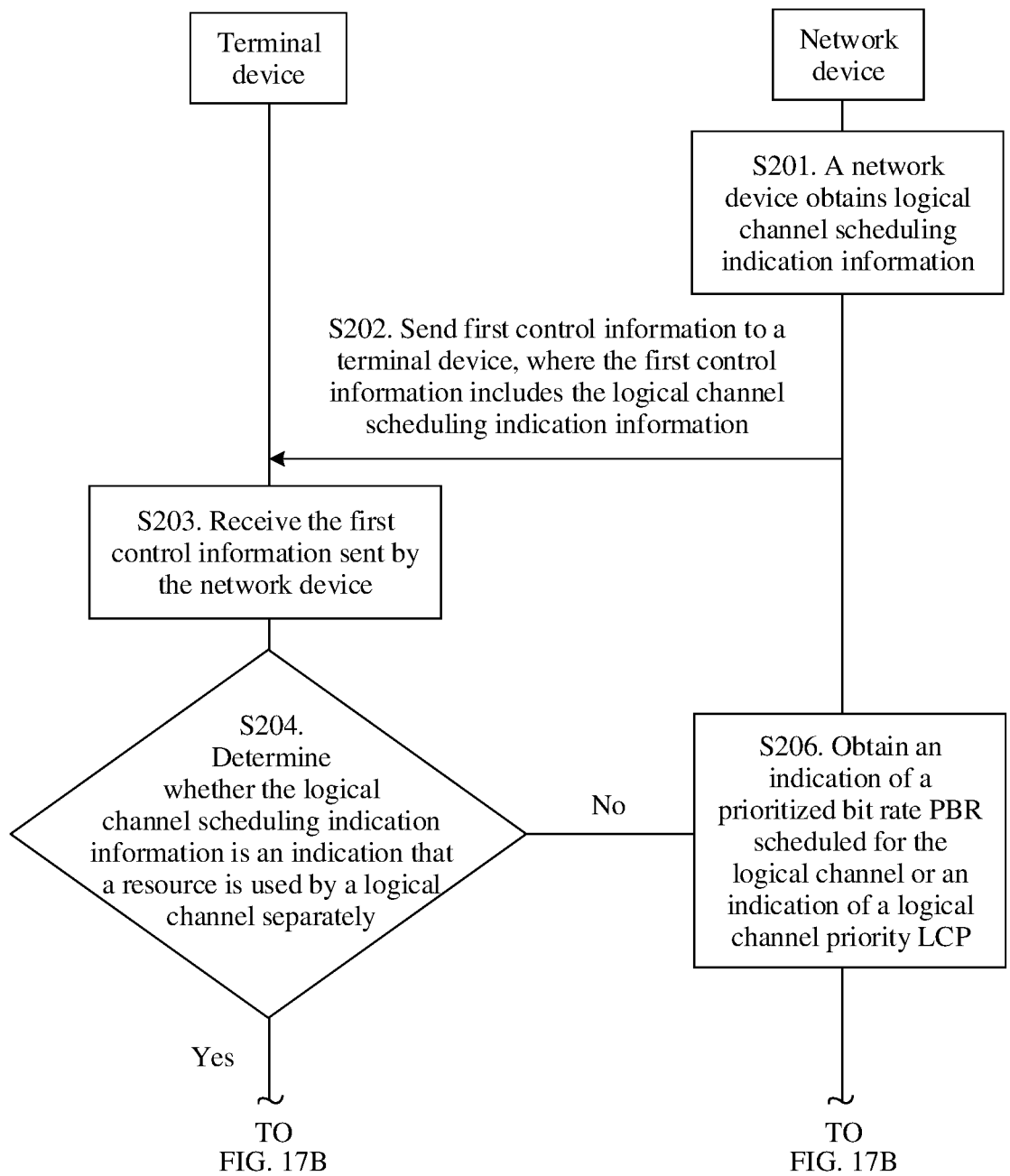
FIG. 17A and FIG. 17B are a schematic flowchart 2 of another logical channel scheduling method according to an embodiment of the present invention.
Figure 17B:
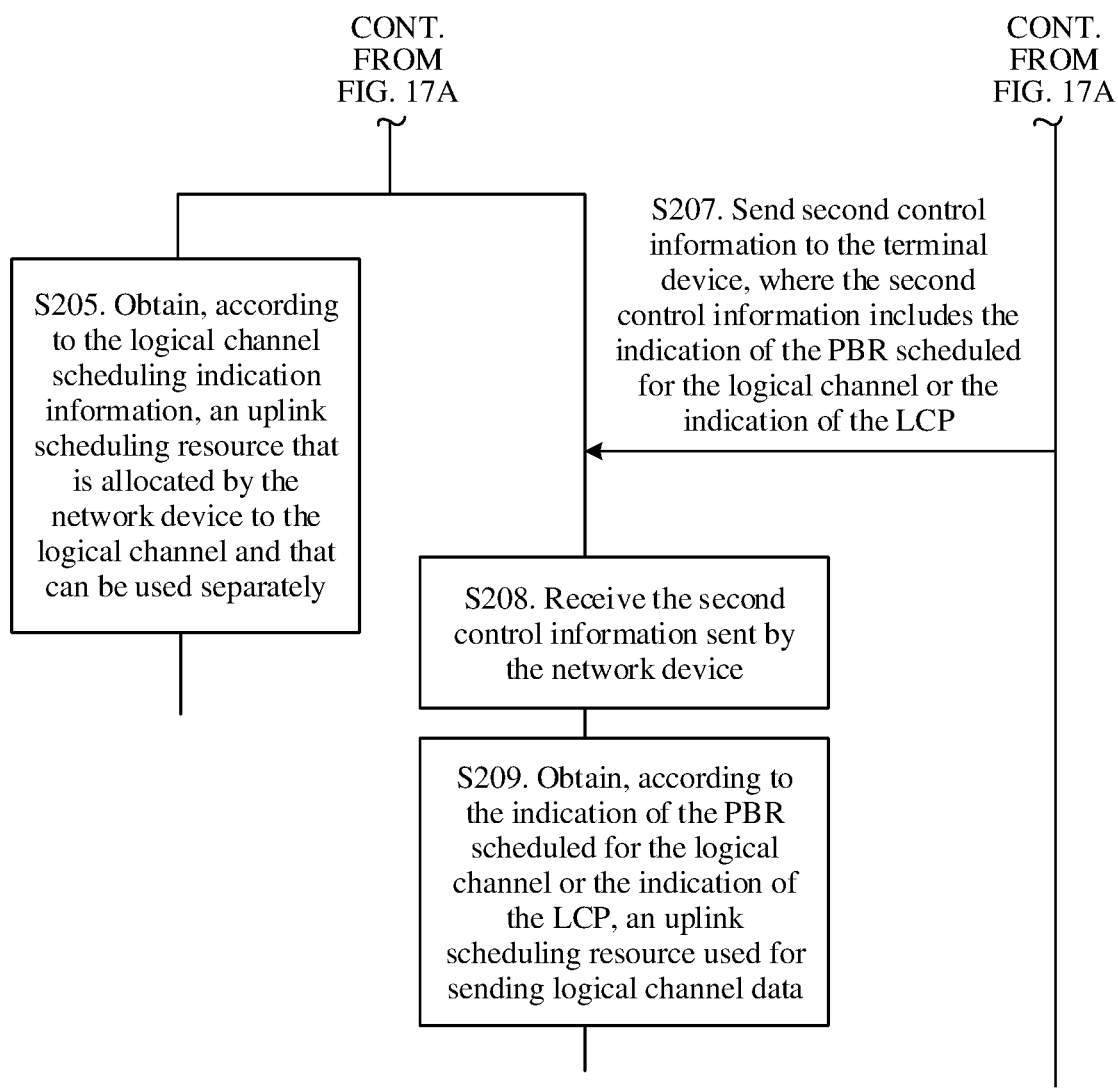

Further, as shown in FIG. 17A and FIG. 17B, the logical channel scheduling method provided in this embodiment of the present invention may further include S206 to S210.

S206. If the logical channel scheduling indication information is the indication that a resource is used by more than one logical channel, the network device obtains an indication of a prioritized bit rate PBR scheduled for the logical channel or an indication of a logical channel priority LCP scheduled for the logical channel.

It should be noted that after determining that the logical channel scheduling indication information is the indication that a resource is used by more than one logical channel, the terminal device may proactively request, from the terminal device, the indication of the PBR scheduled for the logical channel or the indication of the LCP scheduled for the logical channel. Alternatively, the network device may monitor the terminal device, and after the terminal device determines that the logical channel scheduling indication information is the indication that a resource is used by more than one logical channel, the network device proactively delivers the indication of the PBR scheduled for the logical channel or the indication of the LCP scheduled for the logical channel. This is not specifically limited in the present invention.

S207. The network device sends second control information to the terminal device, where the second control information includes the indication of the PBR scheduled for the logical channel or the indication of the LCP scheduled for the logical channel.

For example, the second control information may be a physical downlink control channel PDCCH or a Medium Access Control control element MAC CE. In addition, compared with a conventional RRC reconfiguration process, the indication of the PBR scheduled for the logical channel or the indication of the LCP scheduled for the logical channel is sent by using a second control message, so as to omit an RRC reconfiguration process required by a logical channel configuration, thereby improving transmission performance of the terminal device while reducing RRC signaling overheads.

S208. The terminal device receives the second control information sent by the network device.

S209. The terminal device obtains, according to the indication of the PBR scheduled for the logical channel or the indication of the LCP scheduled for the logical channel, an uplink scheduling resource used for sending logical channel data.

Figure 18A:
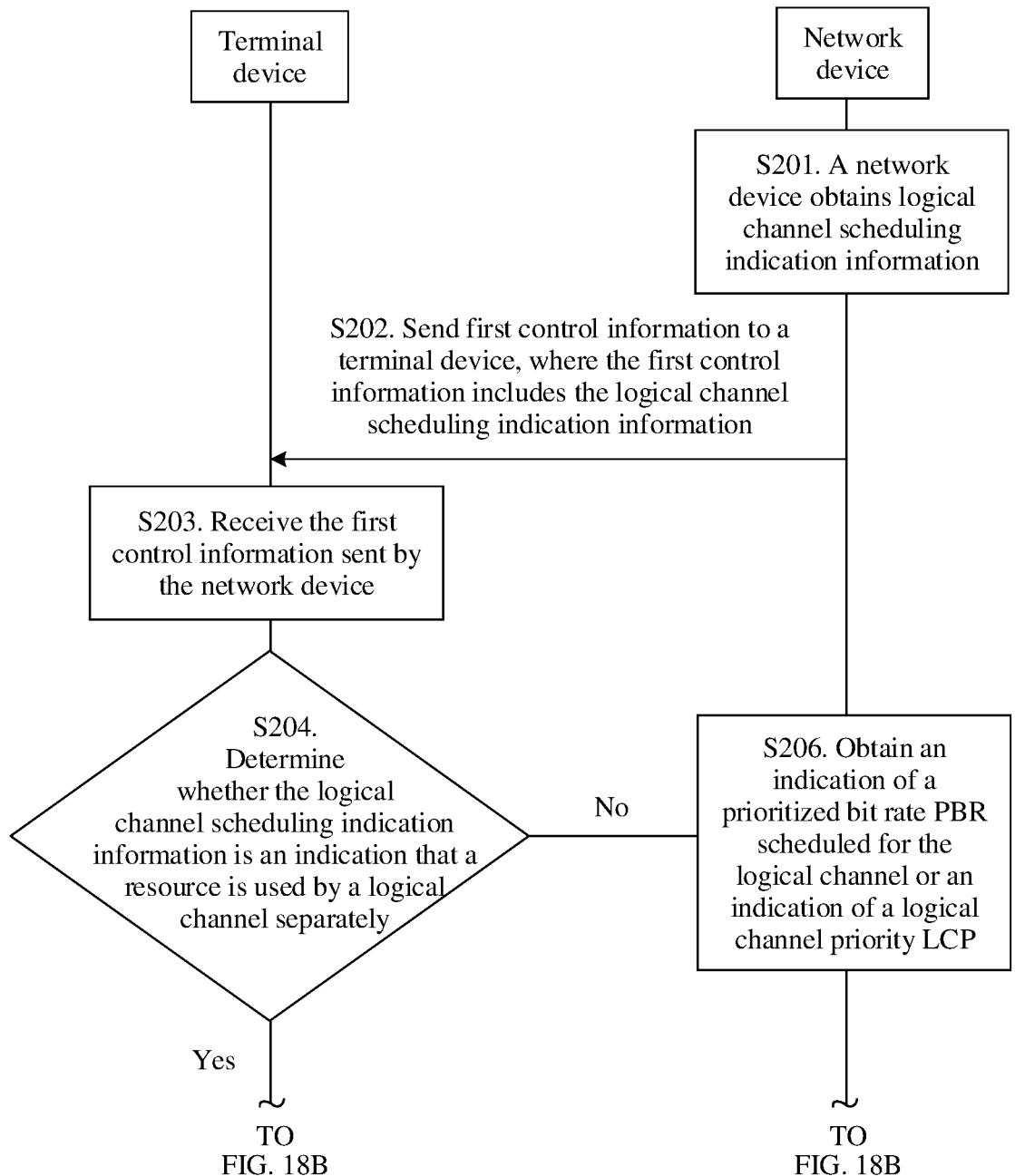
FIG. 18A and FIG. 18B are a schematic flowchart 3 of another logical channel scheduling method according to an embodiment of the present invention.
Figure 18B:
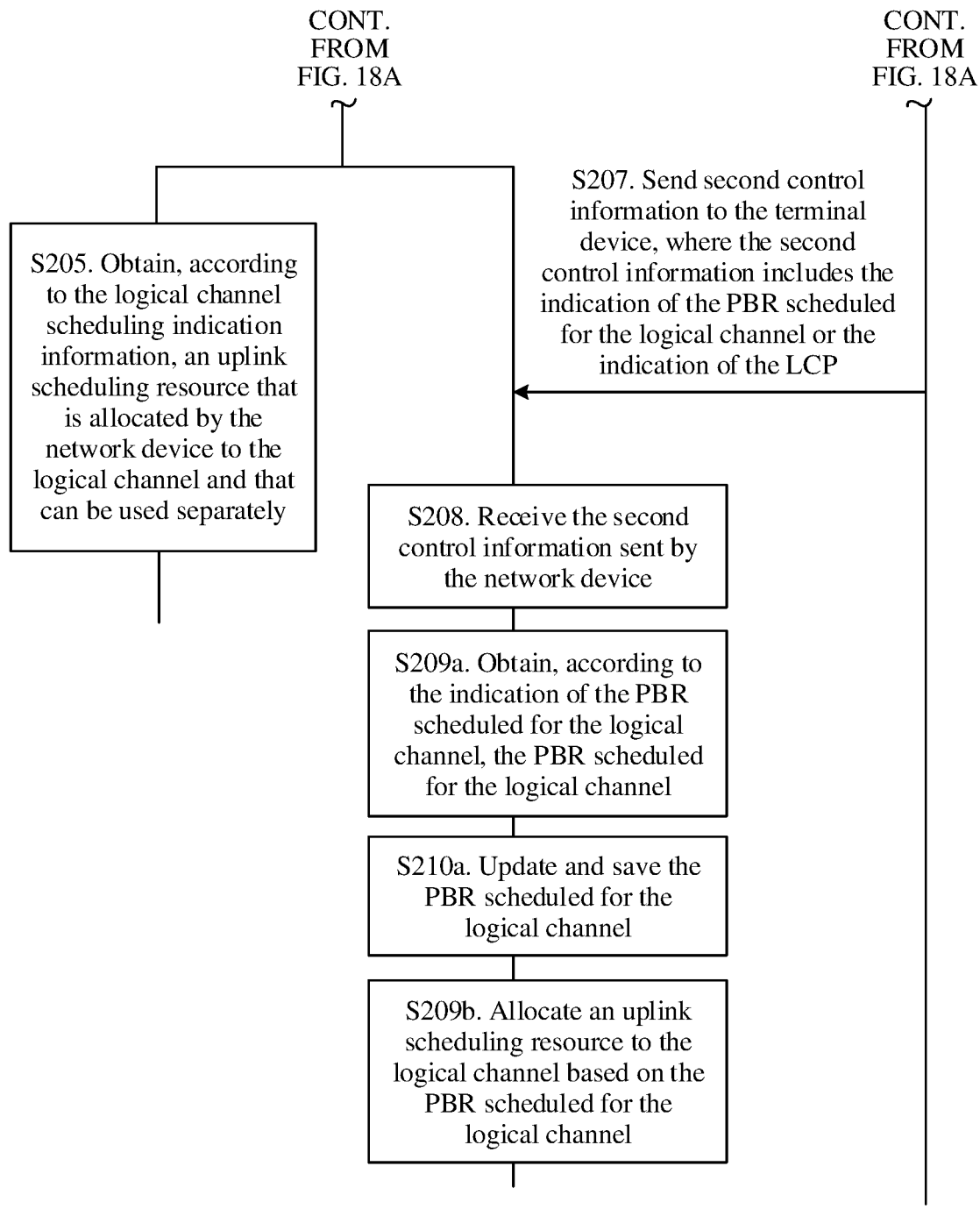

Specifically, when the second control information includes the indication of the prioritized bit rate PBR scheduled for the logical channel, as shown in FIG. 18B, step S209 may include steps S209a and S209b.

S209a. The terminal device obtains, according to the indication of the PBR scheduled for the logical channel, the PBR scheduled for the logical channel.

S209b. The terminal device allocates an uplink scheduling resource to the logical channel based on the PBR scheduled for the logical channel.

Optionally, after step S209a is performed, this embodiment of the present invention further includes step S210a.

S210a. The terminal device updates and stores the PBR scheduled for the logical channel.

Likewise, there is no sequence between step S210a and step S209b.

Figure 19A:
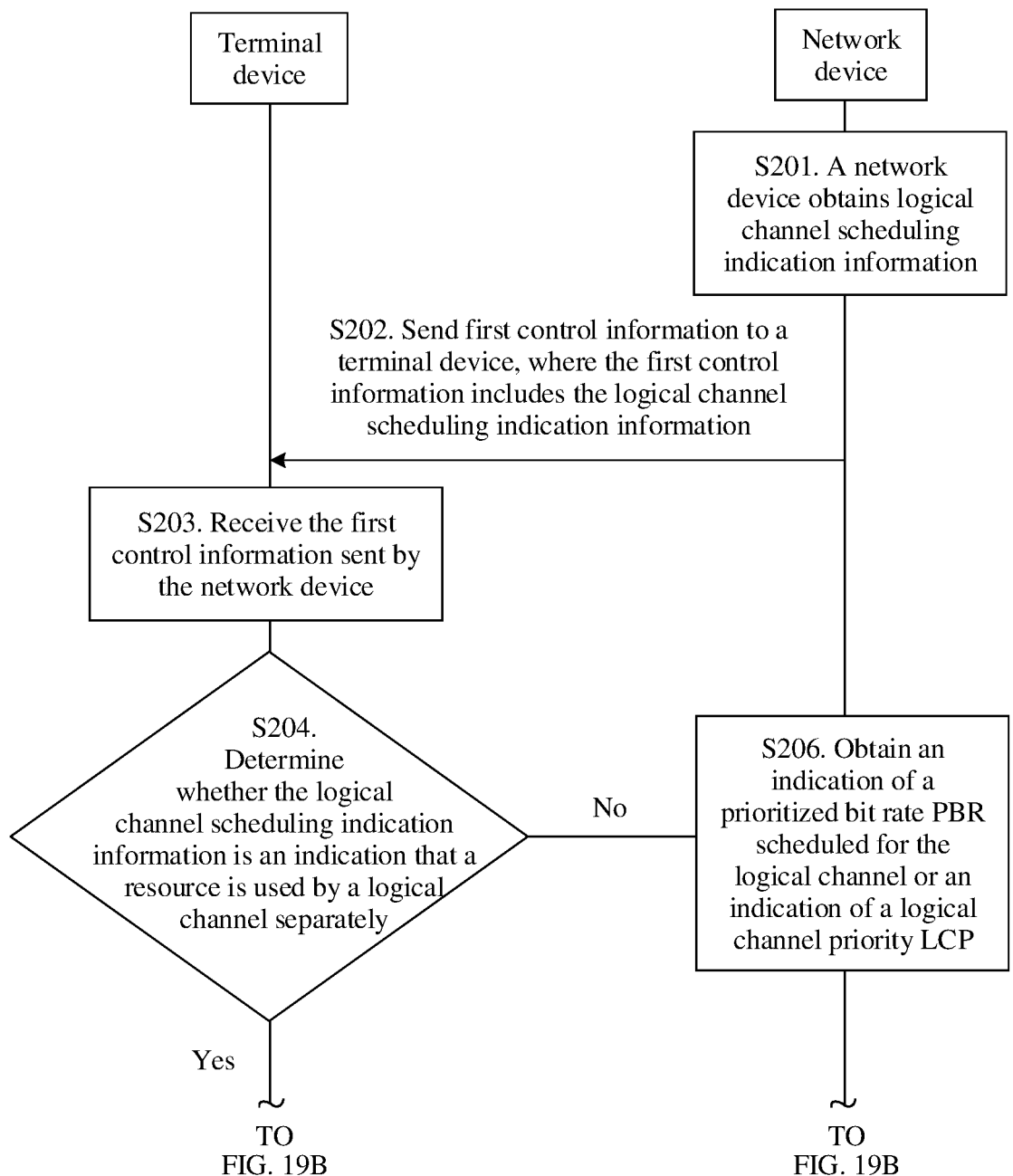
FIG. 19A and FIG. 19B are a schematic flowchart 4 of another logical channel scheduling method according to an embodiment of the present invention.
Figure 19B:
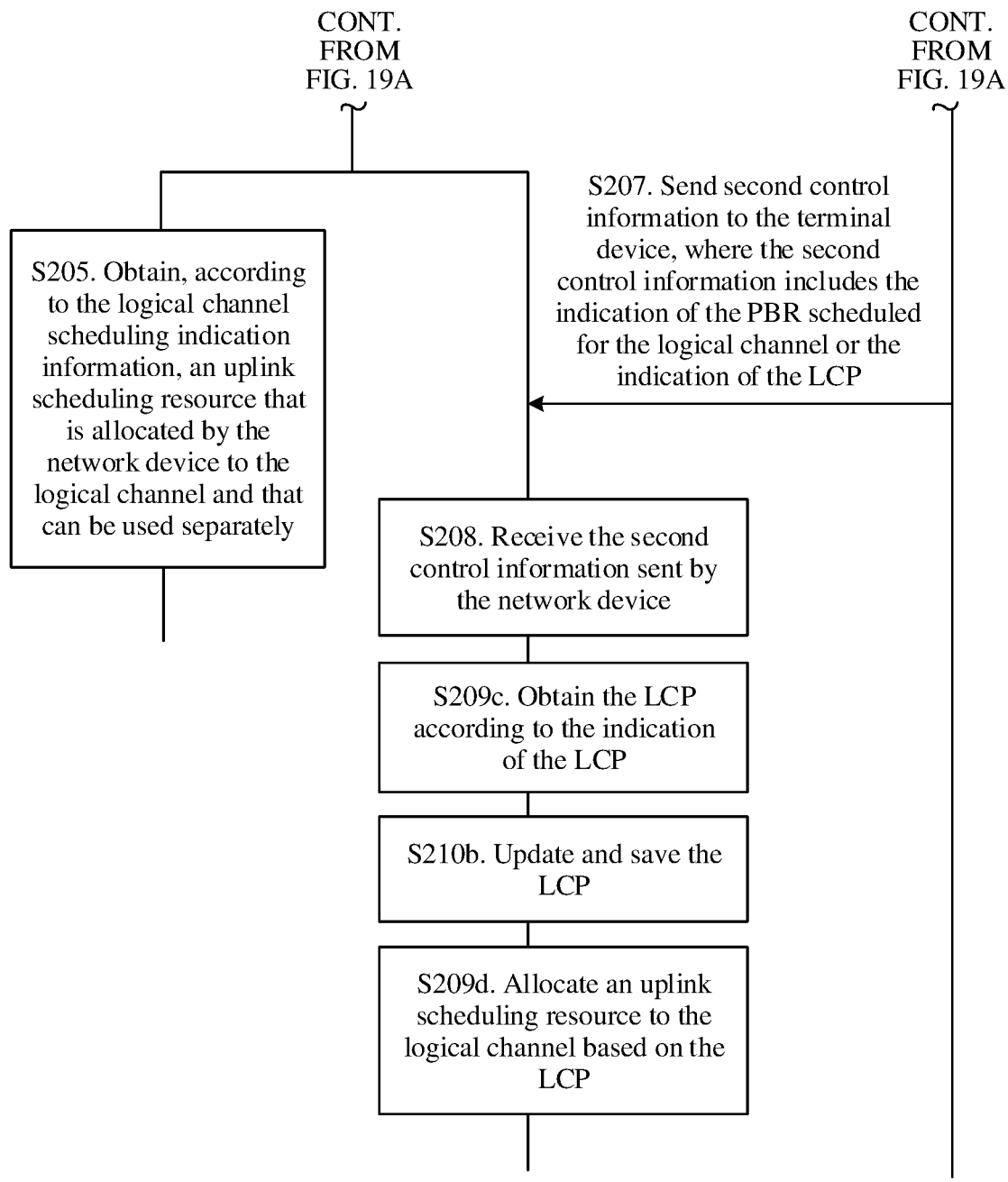

Specifically, when the second control information includes the indication of the logical channel priority LCP, as shown in FIG. 19B, step S209 may include steps S209c and S209d.

S209c. The terminal device obtains the LCP according to the indication of the LCP.

S209d. The terminal device allocates an uplink scheduling resource to the logical channel based on the LCP.

Optionally, after step S209c is performed, this embodiment of the present invention further includes step S210b.

S210b. The terminal device updates and stores the LCP.

Likewise, there is no sequence between step S210b and step S209d.

Specifically, for related descriptions in step S209 and step S210, refer to the corresponding descriptions in steps S103 to S105 in the foregoing embodiment. For brevity, details are not described herein again.

According to the logical channel scheduling method provided in this embodiment of the present invention, the terminal device receives the first control information sent by the network device, where the first control information includes the logical channel scheduling indication information, and the logical channel scheduling indication information is the indication that a resource is used by a logical channel separately or the indication that a resource is used by more than one logical channel, the terminal device determines that the logical channel scheduling indication information is the indication that a resource is used by a logical channel separately, and the terminal device obtains, according to the logical channel scheduling indication information, the uplink scheduling resource that is allocated by the network device to the logical channel and that can be used separately. Based on the foregoing descriptions of this embodiment, in the logical channel scheduling method provided in this embodiment of the present invention, the terminal device first can receive the first control information that is sent by the network device and that includes the logical channel scheduling indication information, and determine whether the logical channel scheduling indication information is the indication that a resource is used by a logical channel separately. If the logical channel scheduling indication information is the indication that a resource is used by a logical channel separately, the terminal device can directly obtain the uplink scheduling resource that is allocated by the network device to the logical channel and that can be used separately. Compared with a conventional RRC reconfiguration process, dynamically sending the logical channel scheduling indication information to the terminal device ensures that the logical channel can have the uplink scheduling resource that can be used separately, so that the logical channel configuration satisfies a real-time scheduling requirement, thereby improving transmission performance of the terminal device.

An embodiment of the present invention provides a terminal device. The terminal device is configured to perform the steps performed by the terminal device in the foregoing logical channel scheduling methods. The terminal device provided in this embodiment of the present invention may include modules that are corresponding to corresponding steps.

In this embodiment of the present invention, the terminal device may be divided into functional modules based on the foregoing method examples. For example, functional modules may be obtained through division corresponding to functions, or at least two functions may be integrated into one functional module. The integrated module may be implemented in a form of hardware, or may be implemented in a form of a software functional module. In this embodiment of the present invention, division of modules is merely an example, and is merely logical function division. There may be another division manner in actual implementation.

Figure 20:
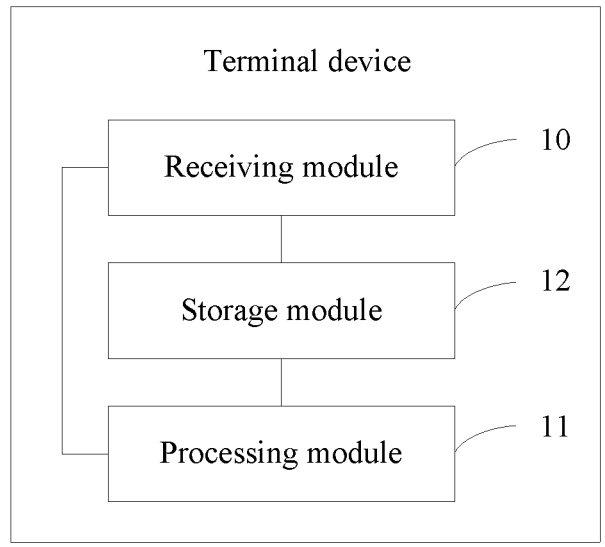
FIG. 20 is a schematic structural diagram 1 of a terminal device according to an embodiment of the present invention.

When the functional modules are obtained through division corresponding to functions, in a possible implementation, FIG. 20 is a possible schematic structural diagram of the terminal device in the foregoing embodiments. As shown in FIG. 20, the terminal device includes a receiving module 10 and a processing module 11. The receiving module 10 is configured to support the terminal device in performing S103 in FIG. 6 to FIG. 9, FIG. 12, and FIG. 13. The processing module 11 is configured to support the terminal device in performing S104 in FIG. 6 to FIG. 9, FIG. 12, and FIG. 13. For function descriptions of corresponding functional modules, refer to all related content of the steps in the foregoing method embodiments. Details are not described herein again. The terminal device further includes a storage module 12, configured to support the terminal device in performing S105 in FIG. 6 to FIG. 9, FIG. 12, and FIG. 13.

Figure 21:
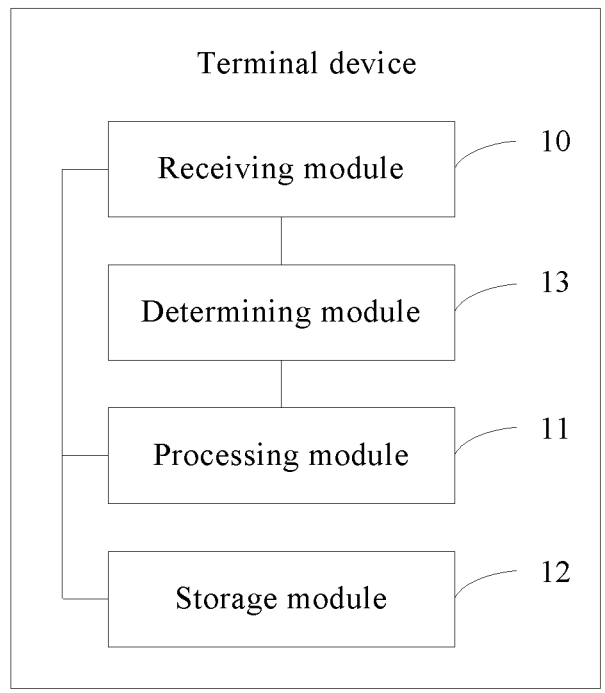
FIG. 21 is a schematic structural diagram 2 of a terminal device according to an embodiment of the present invention.

When the functional modules are obtained through division corresponding to functions, in another possible implementation, FIG. 21 is a possible schematic structural diagram of the terminal device in the foregoing embodiments. As shown in FIG. 21, the terminal device includes a receiving module 10, a determining module 13, and a processing module 11. The receiving module 10 is configured to support the terminal device in performing S203 and S208 in FIG. 16 to FIG. 19B. The determining module 13 is configured to support the terminal device in performing S204 in FIG. 16 to FIG. 19A. The processing module 11 is configured to support the terminal device in performing S205 and S209 in FIG. 16 to FIG. 19B. For function descriptions of corresponding functional modules, refer to all related content of the steps in the foregoing method embodiments. Details are not described herein again. The terminal device further includes a storage module 12, configured to support the terminal device in performing S210a and S2100b in FIG. 16 to FIG. 19B.

Figure 22:
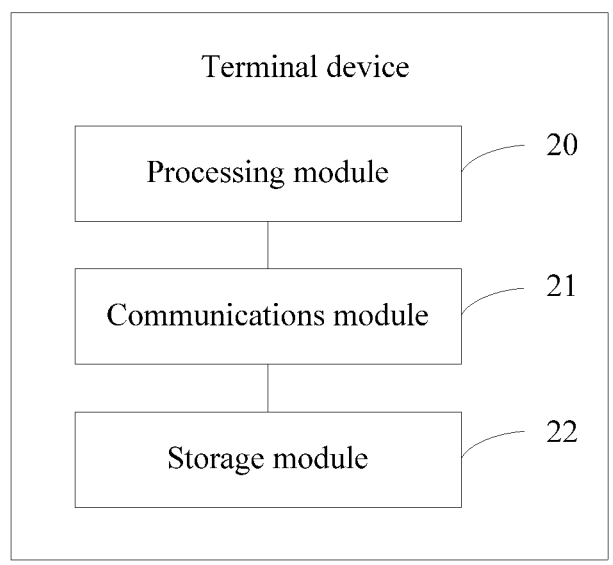
FIG. 22 is a schematic structural diagram 3 of a terminal device according to an embodiment of the present invention.

When an integrated unit is used, FIG. 22 is a possible schematic structural diagram of the terminal device in the foregoing embodiments. As shown in FIG. 22, the terminal device includes a processing module 20 and a communications module 21. The processing module 20 is configured to control and manage an action of the terminal device. For example, the processing module 20 is configured to support the terminal device in performing S104 in FIG. 6 to FIG. 9, FIG. 12, and FIG. 13, and/or configured to perform another process of the technology described in this specification. The communications module 21 is configured to support the terminal device in communicating with another communications device. Specifically, the communications module 21 may be integrated with functions of a sending module and a receiving module. For example, the communications module 21 is configured to support the terminal device in performing S103 in FIG. 6 to FIG. 9, FIG. 12, and FIG. 13. The terminal device may further include a storage module 22, configured to support the terminal device in performing S105 in FIG. 6 to FIG. 9, FIG. 12, and FIG. 13, store the PBR scheduled for the logical channel and the LCP scheduled for the logical channel that are mentioned in the foregoing embodiments, and store program code and data of the terminal device.

The processing module 20 may be a processor or a controller, for example, may be a central processing unit (CPU) or a digital signal processor (DSP). The processing module 20 may implement or execute various example logical blocks, modules, and circuits described with reference to content disclosed in this application. The communications module 21 may be a transceiver, a transceiver circuit, a communications interface, or the like.

The communications module 21 may alternatively be a communications interface configured to exchange data with an external device. The communications module may include two communications interfaces: a sending interface configured to send data to the external device and a receiving interface configured to receive data from the external device. In other words, the terminal device may respectively receive and send data through the two different communications interfaces. Certainly, the communications module 21 may integrate a data receiving function and a data sending function into one communications interface, and the communications interface has the data receiving function and the data sending function. The communications interface may be integrated on a Bluetooth chip or an NFC chip.

The storage module 22 may be a memory, configured to store the PBR scheduled for the logical channel and the LCP scheduled for the logical channel that are mentioned in the foregoing embodiments, and the memory may be further configured to store the program code and the data of the terminal device.

Figure 23:
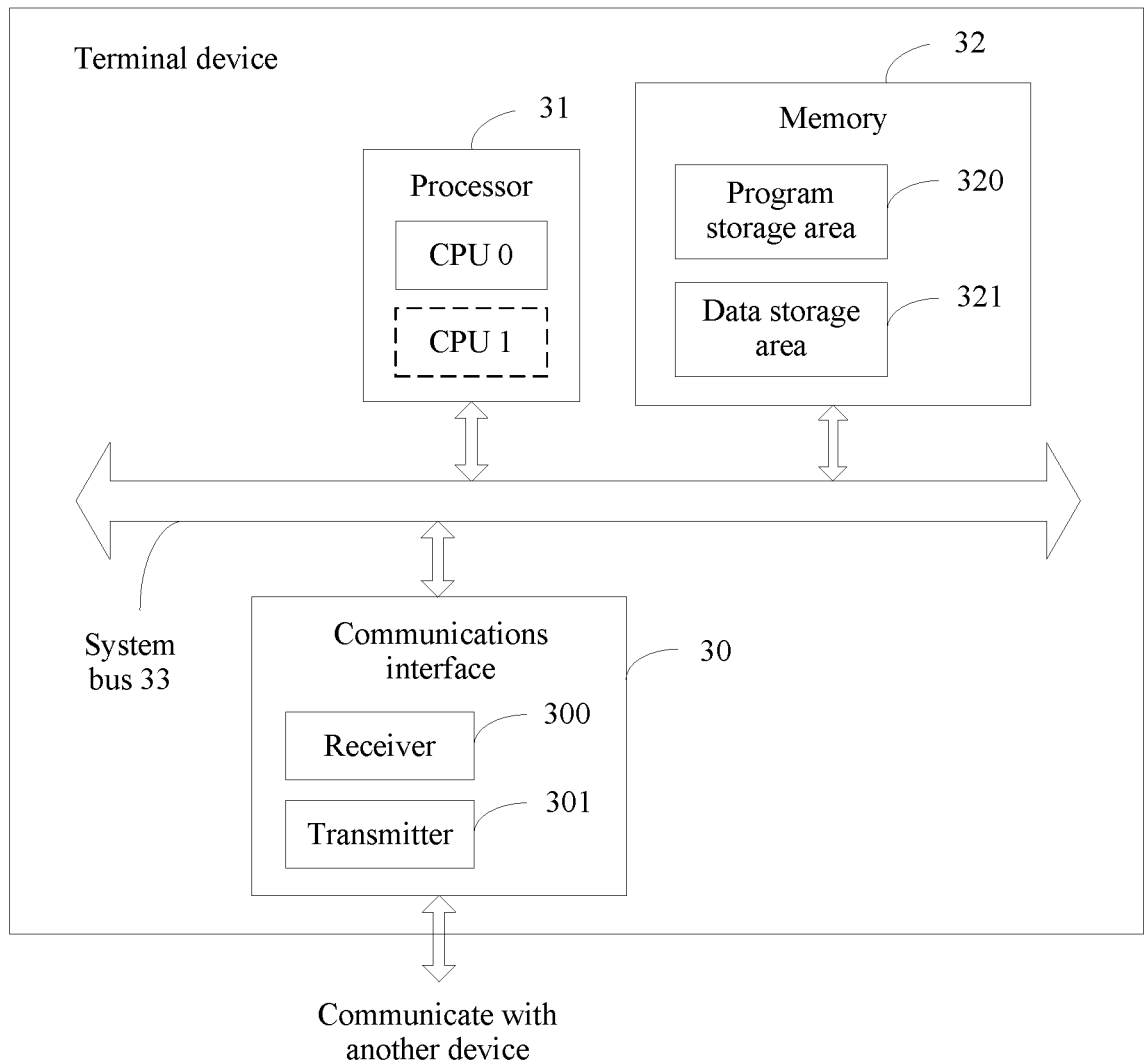
FIG. 23 is a schematic structural diagram 4 of a terminal device according to an embodiment of the present invention.

When the processing module 20 is a processor, the communications module 21 is a communications interface, and the storage module 22 is a memory, the terminal device in this embodiment of the present invention may be a terminal device shown in FIG. 23.

As shown in FIG. 23, the terminal device includes a communications interface 30, a processor 31, and a memory 32. The communications interface 30, the processor 31, and the memory 32 are connected to and communicate with each other by using a system bus 33.

When the terminal device runs, the terminal device performs the logical channel scheduling method in the foregoing embodiments. For a specific logical channel scheduling method, refer to related descriptions in the embodiments shown in FIG. 6 to FIG. 9, FIG. 12, and FIG. 13. Details are not described herein again.

The communications interface 30 is configured to communicate with another device or communications network, such as the Ethernet or a WLAN. Specifically, the communications interface 30 may mainly include a receiver 300 and a transmitter 301. The receiver 300 may receive data sent by the another device or communications network, and the transmitter 301 may send data to the another device or communications network.

The memory 32 may be configured to store the PBR scheduled for the logical channel and the LCP scheduled for the logical channel that are mentioned in the foregoing embodiments, and may be further configured to store program code and an application module of the terminal device. The processor 31 runs a software program and the application module that are stored in the memory 32, to perform various function applications and data processing of the terminal device.

The memory 32 may mainly include a program storage area 320 and a data storage area 321. The program storage area 320 may store an operating system and an application program that is required by at least one function. The data storage area 321 may store the PBR scheduled for the logical channel and the LCP scheduled for the logical channel that are mentioned in the foregoing embodiments. In an implementation provided in the present invention, if the terminal device is a device such as a mobile phone or a tablet computer, the operating system may be an Android system, an iOS system, a Windows operating system, or the like, or may be an embedded operating system such as VxWorks.

The memory 32 may be a read-only memory (ROM) or another type of static storage device that can store static information and a static instruction, or a random access memory (RAM) or another type of dynamic storage device that can store information and an instruction, or may be an electrically erasable programmable read-only memory (EEPROM), a magnetic disk storage medium or another magnetic storage device, or any other medium that can be configured to carry or store expected program code having an instruction or a data structure form and that can be accessed by the terminal device. This is not limited herein.

The memory 32 may exist independently, and is connected to the processor 31 by using the system bus 33. Alternatively, the memory 32 may be integrated with the processor 31.

The processor 31 is a control center of the terminal device. The processor 31 connects various parts of the entire terminal device by using various interfaces and lines, and performs various functions and data processing of the terminal device by running or executing the software program and/or the application module that are/is stored in the memory 32 and by invoking data stored in the memory 32, so as to perform overall monitoring on the terminal device.

During specific implementation, in an embodiment, the processor 31 may include one or more CPUs. For example, the processor 31 in FIG. 23 includes a CPU 0 and a CPU 1.

The system bus 33 may be an ISA (Industry Standard Architecture) bus, a peripheral component interconnect (PCI) bus, an extended industry standard architecture (EISA) bus, or the like. The system bus 33 may be classified into an address bus, a data bus, a control bus, and the like. In this embodiment of the present invention, for a clear description, various buses are shown as the system bus 33 in FIG. 23.

Further, the terminal device may further include a power supply (not shown in the figure), configured to supply power to different components of the terminal device, to maintain operation of the components. As general understanding, the power supply may be a built-in battery such as a common lithium ion battery or a NiMH battery, or may include an external power supply directly supplying power to the terminal device, such as an alternating current (AC) adapter. In some implementations provided in this embodiment of the present invention, the power supply may have a wider meaning, for example, may further include a power management system, a charging system, a power supply fault detection circuit, a power supply converter or inverter, a power supply status indicator (for example, a light emitting diode), and any other component related to power generation, management, and distribution of the terminal device.

Correspondingly, another embodiment of this application further provides a computer readable storage medium. The computer readable storage medium includes one or more pieces of program code. The one or more programs include instructions. When the processor in the terminal device executes the program code, the terminal device performs the logical channel scheduling methods described in the foregoing embodiments.

An embodiment of the present invention provides a terminal device. Based on the descriptions of the foregoing embodiments, according to the logical channel scheduling method provided in the embodiments of the present invention, the terminal device can directly receive control information sent by a network device, and the control information includes an indication that a logical channel does not support multiplexing and that a resource is used by the logical channel separately, a PBR scheduled for the logical channel, or an LCP scheduled for the logical channel, to obtain, by using the indication that the logical channel does not support multiplexing and that a resource is used by the logical channel separately, the PBR scheduled for the logical channel, or the LCP scheduled for the logical channel, an uplink scheduling resource used for sending logical channel data. Compared with a conventional RRC reconfiguration process, dynamically sending logical channel scheduling indication information to the terminal device ensures that a logical channel configuration satisfies a real-time scheduling requirement. In addition, in the logical channel scheduling indication method in which the indication of the PBR scheduled for the logical channel or the indication of the LCP scheduled for the logical channel is sent by using a control message, an RRC reconfiguration process required by the logical channel configuration is avoided, so that transmission performance of the terminal device is improved while RRC signaling overheads are reduced.

An embodiment of the present invention provides a network device. The network device is configured to perform the steps performed by the network device in the foregoing logical channel scheduling methods. The network device provided in this embodiment of the present invention may include modules that are corresponding to corresponding steps.

In this embodiment of the present invention, the network device may be divided into functional modules based on the foregoing method examples. For example, functional modules may be obtained through division corresponding to functions, or at least two functions may be integrated into one functional module. The integrated module may be implemented in a form of hardware, or may be implemented in a form of a software functional module. In this embodiment of the present invention, division of modules is merely an example, and is merely logical function division. There may be another division manner in actual implementation.

Figure 24:
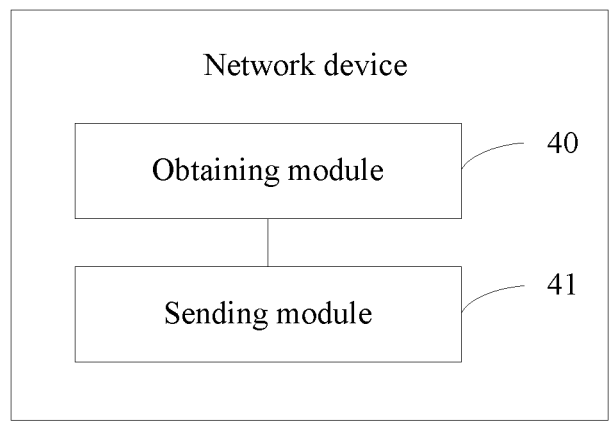
FIG. 24 is a schematic structural diagram 1 of a network device according to an embodiment of the present invention.

When the functional modules are obtained through division corresponding to functions, FIG. 24 is a possible schematic structural diagram of the network device in the foregoing embodiments. As shown in FIG. 24, the network device includes an obtaining module 40 and a sending module 41. The obtaining module 40 is configured to support the network device in performing S101 in FIG. 6 to FIG. 9, FIG. 12, and FIG. 13 or support the network device in performing S201 and S206 in FIG. 16 to FIG. 19B. The sending module 41 is configured to support the network device in performing S102 in FIG. 6 to FIG. 9, FIG. 12, and FIG. 13 or support the network device in performing S202 and S207 in FIG. 16 to FIG. 19B. For function descriptions of corresponding functional modules, refer to all related content of the steps in the foregoing method embodiments. Details are not described herein again.

Figure 25:
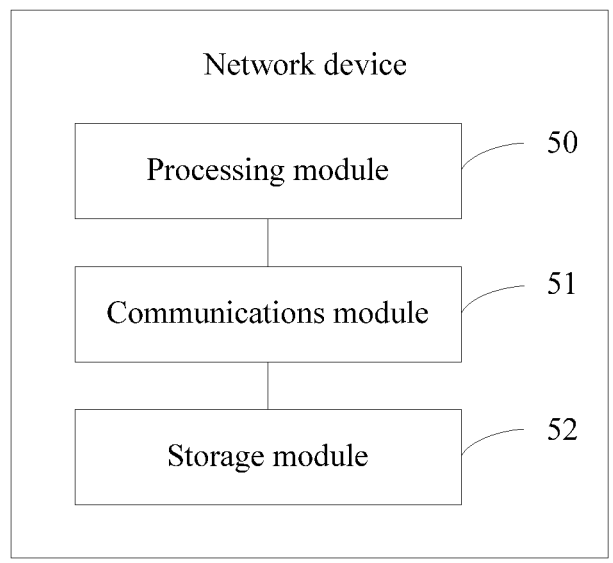
FIG. 25 is a schematic structural diagram 2 of a network device according to an embodiment of the present invention.

When an integrated unit is used, FIG. 25 is a possible schematic structural diagram of the network device in the foregoing embodiments. As shown in FIG. 25, the network device includes a processing module 50 and a communications module 51. The processing module 50 is configured to control and manage an action of the network device. For example, the processing module 50 is configured to support the network device in performing S101 in FIG. 6 to FIG. 9, FIG. 12, and FIG. 13, and/or configured to perform another process of the technology described in this specification. The communications module 51 is configured to support the network device in communicating with another communications device. Specifically, the communications module 51 may be integrated with functions of a sending module and a receiving module. For example, the communications module 51 is configured to support the network device in performing S102 in FIG. 6 to FIG. 9, FIG. 12, and FIG. 13. The network device may further include a storage module 52, configured to store program code and data of the network device.

The processing module 50 may be a processor or a controller, for example, may be a CPU or a DSP. The processing module 50 may implement or execute various example logical blocks, modules, and circuits described with reference to content disclosed in this application.

The communications module 51 may alternatively be a communications interface configured to exchange data with an external device. The communications module may include two communications interfaces: a sending interface configured to send data to the external device and a receiving interface configured to receive data from the external device. In other words, the network device may respectively receive and send data through the two different communications interfaces. Certainly, the communications module 51 may integrate a data receiving function and a data sending function into one communications interface, and the communications interface has the data receiving function and the data sending function. The communications interface may be integrated on a Bluetooth chip or an NFC chip.

The storage module 52 may be a memory, configured to store the PBR scheduled for the logical channel and the LCP scheduled for the logical channel that are mentioned in the foregoing embodiments, and the memory may be further configured to store program code and data of the network device.

Figure 26:
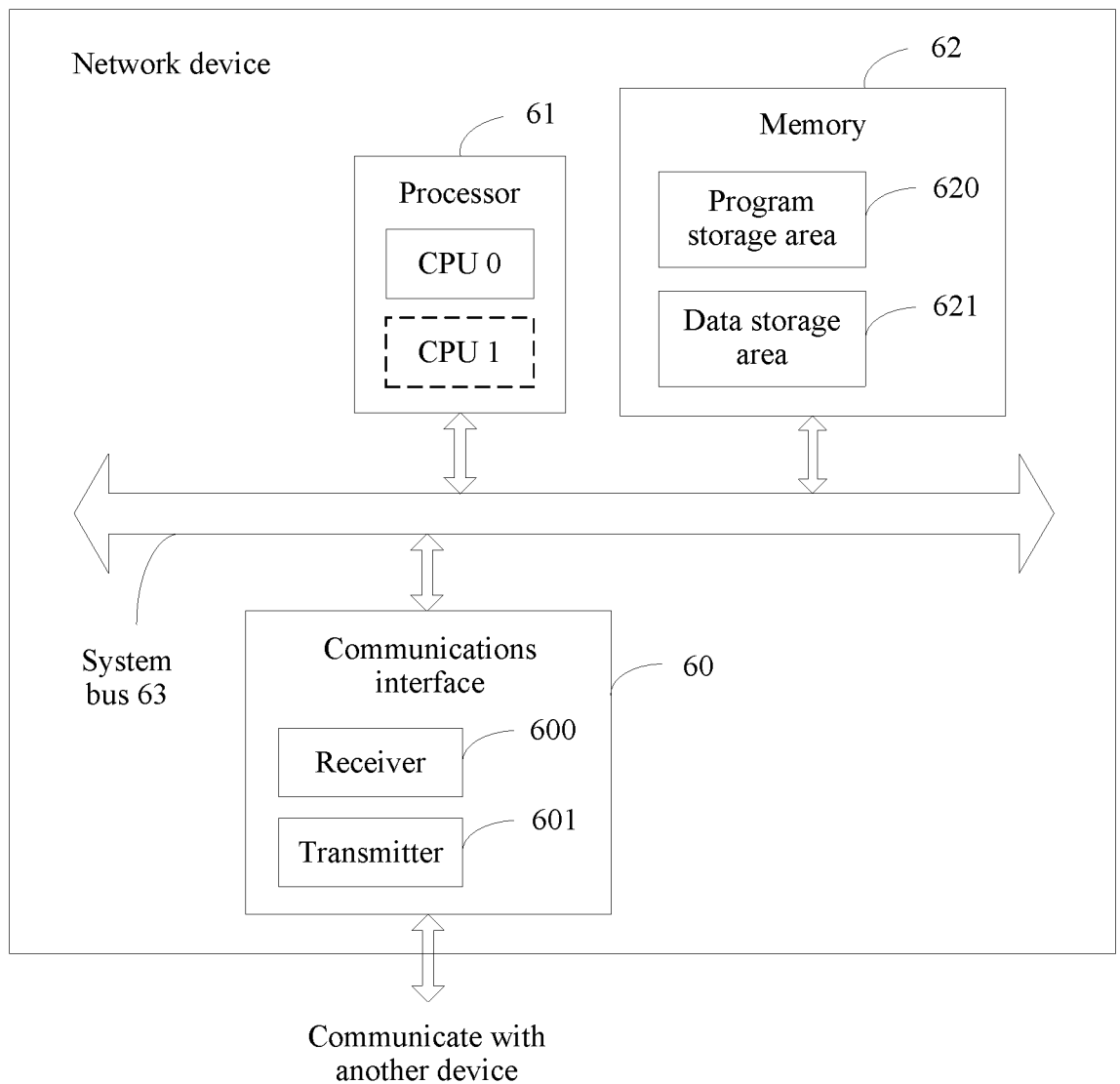
FIG. 26 is a schematic structural diagram 3 of a network device according to an embodiment of the present invention.

When the processing module 50 is a processor, the communications module 51 is a communications interface, and the storage module 52 is a memory, the network device in this embodiment of the present invention may be a network device shown in FIG. 26.

As shown in FIG. 26, the network device includes a communications interface 60, a processor 61, and a memory 62. The communications interface 60, the processor 61, and the memory 62 are connected to and communicate with each other by using a system bus 63.

When the network device runs, the network device performs the logical channel scheduling method in the foregoing embodiments. For a specific logical channel scheduling method, refer to related descriptions in the embodiments shown in FIG. 6 to FIG. 9, FIG. 12, and FIG. 13. Details are not described herein again.

The communications interface 60 is configured to communicate with another device or communications network, such as the Ethernet or a WLAN. Specifically, the communications interface 60 may mainly include a receiver 600 and a transmitter 601. The receiver 600 may receive data sent by the another device or communications network, and the transmitter 601 may send data to the another device or communications network.

The memory 62 may be configured to store program code and an application module of the network device. The processor 61 runs a software program and the application module that are stored in the memory 62, to perform various function applications and data processing of the network device.

The memory 62 may mainly include a program storage area 620 and a data storage area 621. The program storage area 620 may store an operating system and an application program that is required by at least one function. The data storage area 621 may store the PBR scheduled for the logical channel and the LCP scheduled for the logical channel that are mentioned in the foregoing embodiments.

The memory 62 may be a ROM or another type of static storage device that can store static information and a static instruction, or a RAM or another type of dynamic storage device that can store information and an instruction, or may be an EEPROM, a magnetic disk storage medium, another magnetic storage device, or any other medium that can be configured to carry or store expected program code having an instruction or a data structure form and that can be accessed by the network device. This is not limited herein.

The memory 62 may exist independently, and is connected to the processor 61 by using the system bus 63. Alternatively, the memory 62 may be integrated with the processor 61.

The processor 61 is a control center of the network device. The processor 61 connects various parts of the entire network device by using various interfaces and lines, and performs various functions and data processing of the network device by running or executing the software program and/or the application module that are/is stored in the memory 62 and by invoking data stored in the memory 62, so as to perform overall monitoring on the network device.

During specific implementation, in an embodiment, the processor 61 may include one or more CPUs. For example, the processor 61 in FIG. 26 includes a CPU 0 and a CPU 1.

The system bus 63 may be an ISA bus, a PCI bus, an EISA bus, or the like. The system bus 63 may be classified into an address bus, a data bus, a control bus, and the like. In this embodiment, for a clear description, various buses are shown as the system bus 63 in FIG. 26.

Further, the network device may further include a power supply (not shown in the figure), configured to supply power to different components of the network device, to maintain operation of the components. As general understanding, the power supply may be a built-in battery such as a common lithium ion battery or a NiMH battery, or may be an external power supply directly supplying power to the network device, such as an AC adapter. In some implementations provided in this embodiment of the present invention, the power supply may have a wider meaning, for example, may further include a power management system, a charging system, a power supply fault detection circuit, a power supply converter or inverter, a power supply status indicator (for example, a light emitting diode), and any other component related to power generation, management, and distribution of the network device.

Correspondingly, another embodiment of this application further provides a computer readable storage medium. The computer readable storage medium includes one or more pieces of program code. The one or more programs include instructions. When the processor in the network device executes the program code, the network device performs the logical channel scheduling methods described in the foregoing embodiments.

An embodiment of the present invention provides a network device. According to the logical channel scheduling method provided in the embodiments of the present invention, a terminal device can directly receive control information sent by the network device, and the control information includes an indication that a logical channel does not support multiplexing and that a resource is used by the logical channel separately, a PBR scheduled for the logical channel, or an LCP, to obtain, by using the indication that the logical channel does not support multiplexing and that a resource is used by the logical channel separately, the PBR scheduled for the logical channel, or the LCP scheduled for the logical channel, an uplink scheduling resource used for sending logical channel data. Compared with a conventional RRC reconfiguration process, dynamically sending logical channel scheduling indication information to the terminal device ensures that a logical channel configuration satisfies a real-time scheduling requirement. In addition, in the logical channel scheduling indication method in which the indication of the PBR scheduled for the logical channel or the indication of the LCP scheduled for the logical channel is sent by using a control message, an RRC reconfiguration process required by the logical channel configuration is avoided, so that transmission performance of the terminal device is improved while RRC signaling overheads are reduced.

An embodiment of the present invention provides a logical channel scheduling system, including the terminal device described in the foregoing embodiments and the network device described in the foregoing embodiments.

In the several embodiments provided in this application, it should be understood that the disclosed system, apparatus, and method may be implemented in other manners.

Based on the foregoing descriptions about implementations, a person skilled in the art can clearly understand that, for the purpose of convenient and brief description, division of the foregoing functional modules is merely used as an example for illustration. During actual application, the foregoing functions can be allocated to different modules for implementation according to a requirement. To be specific, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or at least two units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer readable storage medium. Based on such an understanding, the technical solutions of this application essentially, or the part contributing to the current system, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A logical channel scheduling method, comprising:
receiving, by a terminal device, control information sent by a network device, wherein the control information comprises logical channel scheduling indication information, wherein the logical channel scheduling indication information is at least one of an indication that a resource is used by a logical channel separately, an update indication of a prioritized bit rate (PBR) scheduled for the logical channel, or an update indication of a logical channel priority (LCP) scheduled for the logical channel, and wherein the logical channel scheduling indication information is scrambled using a scrambling radio network temporary identifier (RNTI); and
obtaining, by the terminal device according to the logical channel scheduling indication information, an uplink scheduling resource for sending logical channel data.

2. The logical channel scheduling method according to claim 1, wherein the receiving the control information comprises:
receiving, by the terminal device, a control message sent by the network device, wherein the control message comprises the control information; and
parsing, by the terminal device, the control message to obtain the logical channel scheduling indication information.

3. The logical channel scheduling method according to claim 2, wherein the control message is a radio resource control (RRC) message, and wherein the RRC message comprises the indication a resource is used by a logical channel separately from other resources; and
wherein the obtaining the uplink scheduling resource comprises:
obtaining, by the terminal device according to the logical channel scheduling indication information, an uplink scheduling resource that is allocated by the network device to the logical channel and that is used separately from other resources.

4. The logical channel scheduling method according to claim 3, wherein the RRC message further comprises at least one of an initial PBR or an initial LCP scheduled for the logical channel.

5. The logical channel scheduling method according to claim 2, wherein the control message is at least one of a physical downlink control channel (PDCCH) or a Medium Access Control control element (MAC CE), and comprises at least one of the update indication of the PBR or the update indication of the LCP scheduled for the logical channel; and
wherein the obtaining the uplink scheduling resource comprises performing at least one of:
obtaining, by the terminal device according to the update indication of the PBR scheduled for the logical channel, the PBR scheduled for the logical channel, and allocating, by the terminal device, the uplink scheduling resource to the logical channel based on the PBR scheduled for the logical channel; or
obtaining, by the terminal device, the LCP according to the update indication of the LCP, and allocating, by the terminal device, the uplink scheduling resource to the logical channel based on the LCP.

6. The logical channel scheduling method according to claim 5, wherein the method further comprises performing, after the obtaining the PBR scheduled for the logical channel or the obtaining the LCP according to the update indication of the LCP:
updating and storing, by the terminal device, at least one of the PBR scheduled for the logical channel or the LCP scheduled for the logical channel.

7. The logical channel scheduling method according to claim 1, wherein the scrambling RNTI is at least one of an RNTI of the logical channel corresponding to the logical channel scheduling indication information or a dedicated RNTI of a radio bearer.

8. The logical channel scheduling method according to claim 1, wherein a length of the update indication of the PBR scheduled for the logical channel is one bit or two bits, and wherein a length of the update indication of the LCP is one bit or four bits.

9. A logical channel scheduling method, comprising:
obtaining, by a network device, logical channel scheduling indication information, wherein the logical channel scheduling indication information is at least one of an indication that a resource is used by a logical channel separately from other resources, an update indication of a prioritized bit rate (PBR) scheduled for the logical channel, or an update indication of a logical channel priority (LCP) scheduled for the logical channel; and
sending, by the network device, control information to a terminal device, wherein the control information comprises the logical channel scheduling indication information, wherein the logical channel scheduling indication information is scrambled using a scrambling radio network temporary identifier (RNTI).

10. The logical channel scheduling method according to claim 9, wherein the sending the control information to the terminal device comprises:
sending, by the network device, a control message to the terminal device, wherein the control message comprises the control information; and
wherein the control message is one of:
a Radio Resource Control (RRC) message comprising the indication that the resource is used by a logical channel separately from other resources; or
at least one of a physical downlink control channel (PDCCH) or a Medium Access Control control element (MAC CE), wherein the control message has the indication comprising the update indication of the PBR scheduled for the logical channel or the update indication of the LCP scheduled for the logical channel.

11. The logical channel scheduling method according to claim 10, wherein the RRC message further comprises at least one of an initial PBR scheduled for the logical channel or an initial LCP scheduled for the logical channel.

12. The logical channel scheduling method according to claim 9, wherein the scrambling RNTI is at least one of an RNTI of the logical channel corresponding to the logical channel scheduling indication information or a dedicated RNTI of a radio bearer.

13. The logical channel scheduling method according to claim 9, wherein a length of the update indication of the PBR scheduled for the logical channel is one bit or two bits, and wherein a length of the update indication of the LCP is one bit or four bits.

14. A terminal device, comprising:
a receiver;
at least one processor; and
a non-transitory computer-readable storage medium storing a program to be executed by the at least one processor, the program including instructions to:
receive, through the receiver, control information sent by a network device, wherein the control information comprises logical channel scheduling indication information, wherein the logical channel scheduling indication information is at least one of an indication that a resource is used by a logical channel separately from other resources, an update indication of a prioritized bit rate (PBR) scheduled for the logical channel, and an update indication of a logical channel priority (LCP) scheduled for the logical channel, and wherein the logical channel scheduling indication information is scrambled using a scrambling radio network temporary identifier (RNTI); and obtain, after the receiver receives the control information sent by the network device, according to the logical channel scheduling indication information, an uplink scheduling resource for sending logical channel data.

15. The terminal device according to claim 14, wherein the program further includes instructions to:
receive a control message sent by the network device; and
decode the control message to obtain the logical channel scheduling indication information, wherein the control message comprises the control information.

16. The terminal device according to claim 15, wherein the control message is a Radio Resource Control (RRC) message, and wherein the RRC message comprises the indication that a resource is used by a logical channel separately; and
wherein program further incudes instructions to obtain, according to the logical channel scheduling indication information, an uplink scheduling resource that is allocated by the network device to the logical channel and that can be used by a logical channel.

17. The terminal device according to claim 16, wherein the RRC message further comprises at least one of an initial PBR scheduled for the logical channel or an initial LCP scheduled for the logical channel.

18. The terminal device according to claim 15, wherein the control message is a physical downlink control channel (PDCCH) or a Medium Access Control control element (MAC CE), and comprises the update indication of the PBR scheduled for the logical channel or the update indication of the LCP scheduled for the logical channel; and
wherein the program further includes instructions to perform at least one of:
obtain, according to the update indication of the PBR scheduled for the logical channel, the PBR scheduled for the logical channel, and allocate the uplink scheduling resource to the logical channel based on the PBR scheduled for the logical channel; or
obtain the LCP according to the update indication of the LCP, and allocate the uplink scheduling resource to the logical channel based on the LCP.

19. The terminal device according to claim 14, wherein the scrambling RNTI is at least one of an RNTI of the logical channel corresponding to the logical channel scheduling indication information or a dedicated RNTI of a radio bearer.

20. The terminal device according to claim 14, wherein a length of the update indication of the PBR scheduled for the logical channel is one bit or two bits, and wherein a length of the update indication of the LCP is one bit or four bits.

* * * * *